(12) United States Patent
Kuwabara et al.

(10) Patent No.: US 7,694,213 B2
(45) Date of Patent: Apr. 6, 2010

(54) VIDEO CONTENT CREATING APPARATUS

(75) Inventors: Kazuhiro Kuwabara, Kyoto (JP);
Noriaki Kuwahara, Kyoto (JP);
Kiyoshi Yasuda, Kyoto (JP); Shinji Abe, Kyoto (JP); Nobuji Tetsutani, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 1166 days.

(21) Appl. No.: 11/260,444

(22) Filed: Oct. 27, 2005

(65) Prior Publication Data

US 2006/0092487 A1    May 4, 2006

(30) Foreign Application Priority Data

| Nov. 1, 2004 | (JP) | 2004-318422 |
| Mar. 30, 2005 | (JP) | 2005-099604 |
| Mar. 31, 2005 | (JP) | 2005-103585 |

(51) Int. Cl.
 *G06F 17/00* (2006.01)
(52) U.S. Cl. .................. 715/201; 715/202; 715/203
(58) Field of Classification Search .......... 715/201–203
 See application file for complete search history.

(56) References Cited

U.S. PATENT DOCUMENTS

| 6,430,566 B1 | 8/2002 | Shiiyama ................. 707/102 |
| 7,054,508 B2 | 5/2006 | Hanamoto ................ 382/305 |
| 7,065,249 B2 | 6/2006 | Fushiki et al. ............ 382/167 |
| 2001/0041020 A1 | 11/2001 | Shaffer et al. ............ 382/305 |
| 2003/0081145 A1 | 5/2003 | Seaman et al. ........... 348/460 |
| 2004/0109197 A1 | 6/2004 | Gardaz et al. ............ 358/1.15 |
| 2005/0008343 A1 | 1/2005 | Frohlich et al. ........... 386/121 |
| 2005/0168453 A1 | 8/2005 | Ueda ....................... 345/204 |

FOREIGN PATENT DOCUMENTS

| EP | 01204309.7 | 5/2002 | .................. 17/30 |
| EP | 03076844.4 | 1/2004 | .................. 27/34 |
| EP | 05100986.8 | 8/2005 | .................. 17/30 |
| GB | 0309961.1 | 11/2004 | |
| JP | 2000-324455 | 11/2000 | |
| JP | 2002-049907 | 2/2002 | |
| JP | 2003-317074 | 11/2003 | |
| JP | 2003-348531 | 12/2003 | |
| JP | 2004-110773 | 4/2004 | |
| JP | 2004-187066 | 7/2004 | |
| JP | 2004-336555 | 11/2004 | |
| JP | 2005-025715 | 1/2005 | |
| JP | 2006-140559 | 6/2006 | |
| WO | WO02/25633 | 3/2002 | |
| WO | WO 03/003371 | 1/2003 | |

*Primary Examiner*—Thu Huynh
(74) *Attorney, Agent, or Firm*—Gerald T. Bodner

(57) ABSTRACT

A video content creating apparatus includes a computer. The computer registers photographic image data input from a photographic input device and meta-information set in relation to the data in a database. After retrieving photographs based on the meta-information, the apparatus selects the photographs to be used for a reminiscence video and decides the reproduction order of the photographs. After registering a BGM playlist, the apparatus reproduces the photographs and BGM for creating the reminiscence video. If there are any regions, the apparatus displays the regions on a monitor while aligning them in sequence according to the meta-information on them. Upon completion of generation (rendering) of a series of reminiscence video contents, the apparatus creates the reminiscence video by saving the rendering results in Flash movie format, for example.

8 Claims, 22 Drawing Sheets

FIG. 16

```
<rt:Rotate Transition rdf: ID = "RT-8">              PORTION OF TABLE OF RENDERING
                                                      ONTOLOGY WRITTEN BY RDF (RT-8)
  <rt: photoInterval rdf: datatype = ="&xsd; unsigned Long>
    2592000       E. G. RANGE OF DATE IS ONE MONTH (SECONDS)
  </rt: phtoInterval>
  <rt: scenarioContinuity rdf: datatype= "&xsd; boolean">

</rt: scenarioContinuity>  CONTINUITY OF SCENARIO IS TRUE
  <rt: RotateTransition>               CONVERSION RULE BETWEEN ANNOTATION ONTOLOGY
                                          OF PHOTOGRAPH AND RENDERING ONTOLOGY
  SELECT ? transition
    WHERE (<firstPhotoURI>, dc:date, ?data_1)   DATE OF FIRST PHOTOGRAPH
          (<lastPhotoURI>, dc: date, ?data_2)   DATE OF LAST PHOTOGRAPH
          (<curPhotoURI>, dc: subject, ?scenario_1)  THEME OF CURRENT PHOTOGRAPH
          (<nextPhotoURI>, dc: subject, ?scenario_2) THEME OF NEXT PHOTOGRAPH
          (?transition, rt:pPhotoInterval, ?interval)       RETRIEVAL OF TRANSITION
          (?transition, rt:scenarioContinuity, ?scenario)  THAT SATISFIES RESTRICTIONS
    AND   (?interval>=(?data_2-?data_1)               RESTRICTION FOR DATE RANGE
    AND   (?scenario!=(?scenario_1 EQ ?scenario_2)          RESTRICTION FOR
    USING                                                SCENARIO CONTINUITY
          dc FOR <http://purl.org/dc/elements/1.1>   DEFINITION OF RENDERING ONTOLOGY
          rt FOR<http://therapy.atr.jp/vocab/rendering_technique#>
```

VIDEO CONTENT CREATING APPARATUS

BACKGROUND OF THE INVENTION

1. Field of the Invention

The present invention relates to a video content creating apparatus. More specifically, the present invention relates to a novel video content creating apparatus that creates a video content such as reminiscence video using past photographs of a dementia patient.

2. Description of the Prior Art

In these days when elderly population is rapidly increasing, it can be said that providing dementia patients with substantial nursing care is an urgent necessity. In general situations, however, as care-giver of a dementia patient, family member(s) must keep an eye on the patient for 24 hours. Thus, family members' ill treatment of dementia patients due to stress has lately become a social issue. In order to reduce the stresses on both the dementia patient and the care-giver, it is important to bring the patient into a stabilized mental state. One approach to the purpose is a reminiscence method by which the patient is exposed to past movies, music, photographs of his/her own, etc. However, this method requires a dedicated person who has a talk with the patient as a companion, and therefore is difficult to practice at home.

On this account, a method using reminiscence video is put forward in a non-patent document 1. Reminiscence video is a slide show produced from the patient's past photographs with BGM and narration.

[Non-patent document 1] Yasuda. K, et al.: "Creation of reminiscence photographic video for dementia patients and evaluation of the degrees of their concentration on it", Proceedings of General Conference of Japan Society for Higher Brain Dysfunctions (2004)

It has been verified that reminiscence video is effective in providing stability to a dementia patent's mental condition. However, the creation of a reminiscence video requires the know-how in video editing and is difficult for general care-givers to deal with.

SUMMARY OF THE INVENTION

Therefore, it is a primary object of the present invention to provide a novel video content creating apparatus.

It is another object of the present invention to provide a video content creating apparatus that makes it possible to create a video content such as a reminiscence video in a relatively easy way using the past photographs of a dementia patient.

It is still another object of the present invention to provide a video content creating apparatus that makes it possible to create a video content such as a reminiscence video for easy to a dementia patient to see.

It is further another object of the present invention to provide a video content creating apparatus that makes it possible to create a video content with narration such as a reminiscence video using the past photographs of a dementia patient.

The present invention in one preferred form is a video content creating apparatus comprising a photograph data input means for inputting photographic image data, a meta-information adding means for adding meta-information in relation to the photographic image data, a storing means for storing the photographic image data together with the related meta-information, a retrieving means for retrieving the photographic image data from the storing means by use of the meta-information, and a creating means for creating a series of video contents by editing according to the meta-information the photographic image data retrieved by the retrieving means.

In the preferred form of the present invention described above, the photograph data input device including an image scanner (20: a reference numeral indicative of a corresponding part or element in the embodiment. The same applies to the following reference numerals.) inputs the photographic image data to a computer (12). The computer is provided with means for adding meta-information to the photographic image data such as Dublin Core, Image Regions, FOAF, etc. These meta-information adding means add the related meta-information to the input photographic image data. The computer stores the photographic image data together with the related meta-information in the storing means (22). The retrieving means (12, S2) retrieves the photographic image data from the storing means by using the meta-information. The creating means (12, S6) creates a video content such as a slide show in the formats of AVI or Flash movie, for example, by editing the retrieved photographic image data according to the meta-information. If the used photographs are the past photographs of a dementia patent, the video content can be called reminiscence video.

In the preferred form of the present invention described above, the photographic image data is edited by use of the meta-information, and thus the user can create a video content such as a reminiscence video in a relatively easy way using the dementia patient's past photographs, for example, even if he/she is not very accustomed to video content creation.

Therefore, according to the present invention, it is possible to create a video content such as a reminiscence video in a relatively easy way by adding the meta-information to the dementia patient's past photographs and editing the photographic images through the use of the meta-information.

The present invention in another preferred form is a video content creating apparatus such as described previously, wherein the meta-information includes region information for a region set in one piece of photographic image data, and the creating means includes an aligning means for aligning an image of the region in a predetermined position according to the region information.

In the preferred form of the present invention described above, if a region is set within one photographic image, the meta-information adding means registers the meta-information of the region, for example, the coordinate position, height, width, etc. of the region. The aligning means (12, S27) aligns the region in the center of a display area by using the meta-information of height and width, for example. Accordingly, the image of the region is automatically edited in the appropriate position, which eliminates the need to perform a bothersome operation for region alignment.

The present invention in another preferred form is a video content creating apparatus such as described previously that further comprises a playlist registering means for registering a playlist containing music numbers, wherein the creating means includes a means for reproducing the music numbers registered as BGM on the playlist in keeping with the reproduction of the photographs using the photographic image data.

In the preferred form of the present invention described above, the playlist registering means (12, S4) registers MP3 music data, for example, on the playlist, and the reproducing means (12, S11) reproduces the music numbers registered on the playlist as BGM in accordance with the reproduction of the photographic images. Therefore, it is possible to add BGM to the photographic images automatically just by registering the music numbers on the playlist, without having to perform any troublesome operation.

The present invention in another preferred form is a video content creating apparatus such as described previously, wherein the creating means includes a video effect applying means for applying a video effect based on the meta-information.

In the preferred form of the present invention described above, the video effect applying means (12, S22, S36) included in the creating means applies such video effects as zoom-in, pan, fade-out, fade-in, etc.

In the preferred form of the present invention described above, the photographic image data is edited by use of the meta-information, which allows the user to create a video content such as a reminiscence video in a relatively easy way using the dementia patient's past photographs, for example, even if he/she is not very accustomed to video content creation. In addition, since various video effects are applied according to the meta-information, it is easy to make the dementia patient as a viewer maintain his/her interest in and attention to the reminiscence video. Thus, it can be expected that the effects of the reminiscence video are further enhanced.

According to the present invention, it is possible to create a video content such as a reminiscence video in a relatively easy way by adding the meta-information to the dementia patient's past photographs and editing the photographic images through the use of the meta-information. In addition, since various video effects are used according to the meta-information, it is easy to make the dementia patient as a viewer maintain his/her interest in and attention to the reminiscence video. Thus, it can be expected that the effects of the reminiscence video are further increased.

The present invention in another preferred form is a video content creating apparatus such as described above, wherein the meta-information includes region information of regions set within one piece of photographic image data, and the image effect applying means applies video effects according to the region information.

In the preferred form of the present invention described above, the video effect applying means (12, S32) adds video effects according to the region information. Thus, appropriate video effects are added automatically with use of the region information, which obviating the necessity to perform a bothersome operation for addition of video effects.

The present invention in another preferred form is a video content creating apparatus such as described above, wherein the region information includes between-regions space information, and the video effect applying means applies varied video effects according to the between-regions space information.

In the preferred form of the present invention described above, if some regions are set within one photographic image, the meta-information adding means registers the meta-information of the region, for example, the coordinate positions, heights, widths, etc. of the regions. Accordingly, the region information contains space information between the regions. The video effect applying means (12, S22) applies varied video effects according to the between-regions space information. For example, if a between-regions space is less than (or, equal to or less than) a predetermined threshold value, the video effect applying means zooms in one region and then pans the next region. If the between-regions space is equal to or more than (or, more than) the predetermined threshold value, the video effect applying means zooms in one region and then fades out that region, instead of panning it, and pans the following region. Since appropriate video effects are automatically added using the between-regions space information in the meta-information, there is no need to perform a bothersome operation for addition of video effects.

The present invention in another preferred form is a video content creating apparatus such as described previously, wherein the meta-information includes photograph information set in each photographic image data, and the video effect applying means applies a video effect according to the photograph information.

In the preferred form of the present invention described above, the video effect applying means (12, S36) adds video effects according to the photograph information. Since appropriate video effects are automatically added with use of the photograph information, there is no necessity to perform a burdensome operation for addition of video effects.

The present invention in another preferred form is a video content creating apparatus such as described above, wherein the photograph information includes date information, and the video effect applying means applies varied video effects according to differences in age between photographs with the date information.

In the preferred form of the present invention described above, when more than one photographic images are captured, it is possible to detect differences in age between the photographs from the dates of photography contained in the meta-information adding means. The video effect applying means (12, S36) applies varied video effects according to the differences in age between the photographs. For example, if a difference in age is less than (or, equal to or less than) a predetermined threshold value, the video effect applying means fades out the preceding photograph while fading in the following photograph, and then makes them overlap with each other. If the difference in age is equal to or more than (or, more than) the predetermined threshold value, the video effect applying means slides the following photograph in. In this manner, since appropriate video effects are automatically added by means of differences in age between the photographs, it is not necessary to perform a troublesome operation for addition of video effects.

The present invention in another preferred form is a video content creating apparatus such as described previously, wherein the photograph information includes personal information, and the video effect applying means applies video effects according to the personal information.

In the preferred form of the present invention described above, when the personal information has revealed that the subject of a photograph is a person memorable for the viewer, the computer applies video effects only to the region in which the subject exists, for example.

The present invention in another preferred form is a video content creating apparatus such as described previously, wherein the photograph information includes color tone information, and the video effect applying means applies video effects according to the color tone information.

In the preferred form of the present invention described above, when the color tone information is detected in which the photographs change from monochrome to colors, for example, the video effect applying means adds video effects in such a manner that the color photographs are firstly displayed in monochrome and then gradually changed into colored state.

The present invention in another preferred form is a video content creating apparatus such as described previously, wherein the creating means includes a narration text creating means for creating a narration text based on the meta-information and a speech data registering means for registering in the storing means speech data according to the narration text in relation to the photographic images.

In the preferred form of the present invention described above, the narration creating means (12, S7) included in the creating means creates a narration text according to the meta-information. The speech data registering means (12, S53, S55) obtains or creates speech data in accordance with the narration text, and unites the speech data with the photographic image data, that is, associates the speech data with the photographic image data and registers it in the storing means.

In the preferred form of the present invention described above, since the photographic image data is edited by means of the meta-information, the user can create a video content such as a reminiscence video in a relatively easy way using the dementia patient's past photographs, for example, even if he/she is not very accustomed to video content creation. In addition, since the narration can be created according to the meta-information, it is easy to make the dementia patient as a viewer maintain his/her interest in and attention to the reminiscence video. Thus, it can be expected that the effects of the reminiscence video are further enhanced.

According to the present invention, it is possible to create a video content such as a reminiscence video in a relatively easy way by adding the meta-information to the dementia patient's past photographs and editing the photographic images through the use of the meta-information. In addition, since narration is applied according to the meta-information, it is easy to make the dementia patient as a viewer maintain his/her interest in and attention to the reminiscence video. Therefore, it can be expected that the effects of the reminiscence video are further promoted.

The present invention in another preferred form is a video content creating apparatus such as described above, wherein the narration text creating means includes a narration pattern setting means for presetting a narration pattern containing at least one word and a word deciding means for deciding the word based on the meta-information, and creates the narration text by applying the word decided by the word deciding means to the word in the narration pattern.

In the preferred form of the present invention described above, the narration pattern setting means (12, 22, Table 5) presets a narration pattern containing at least one word, basically a noun, and creates a narration text by applying the word decided by the word deciding means to the word in the narration pattern. In this manner, a narration text can be easily created just by applying the preset word to the narration pattern.

The present invention in another preferred form is a video content creating apparatus such as described above, wherein the word deciding means includes a dictionary for deriving a word by use of a keyword.

In the preferred form of the present invention described above, the word is derived by use of the keyword from a thesaurus or a co-occurrence dictionary, which makes it easy to apply the word and thus create the narration.

The present invention in another preferred form is a video content creating apparatus such as described above, wherein the word deciding means includes a keyword extracting means for extracting the keyword from the meta-information.

In the preferred form of the present invention described above, the keyword extracting means (12, S47) extracts the required keyword from the meta-information registered in the storing means, for example, person, object, place, season, etc. Then the above mentioned word deciding means decides a word according to the keyword.

The present invention in another preferred form is a video content creating apparatus such as described previously, wherein the word deciding means includes a keyword input means for accepting input of the keyword by the user.

In the preferred form of the present invention described above, the word deciding means may decide a word based on the keyword input by the user. Therefore, it is possible to create the narration even if no significant keyword is extracted from the meta-information.

The present invention in another preferred form is a video content creating method including a photograph data input step of inputting photographic image data, a meta-information adding step of adding meta-information in relation to the photographic image data, a storing step of storing the photographic image data together with the related meta-information, a retrieving step of retrieving the photographic image data from the storing means by use of the meta-information, and a creating step of creating a series of video contents by editing according to the meta-information the photographic image data retrieved by the retrieving means.

The method of the present invention described above has the same effects as those of the video content creating apparatus of the present invention described previously.

The present invention in another preferred form is a video content creating method such as described above, wherein the creating step includes a video effect applying step of applying video effects based on the meta-information.

The preferred form of the video content creating method of the present invention described above has the same effects as those of the video content creating apparatus of the present invention described previously.

The present invention in another preferred form is a video content creating method such as described previously, wherein the creating step includes a narration text creating step of creating a narration text based on the meta-information and a speech data registering step of registering in the storing means the speech data according to the narration text in relation to the photographic image.

The preferred form of the video content creating method of the present invention described above has the same effects as those of the video content creating apparatus of the present invention described previously.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a table showing one example of representation of rendering template for "RT-8" listed in Table 3;

DETAILED DESCRIPTION OF THE PREFERRED EMBODIMENTS

Figure 1:
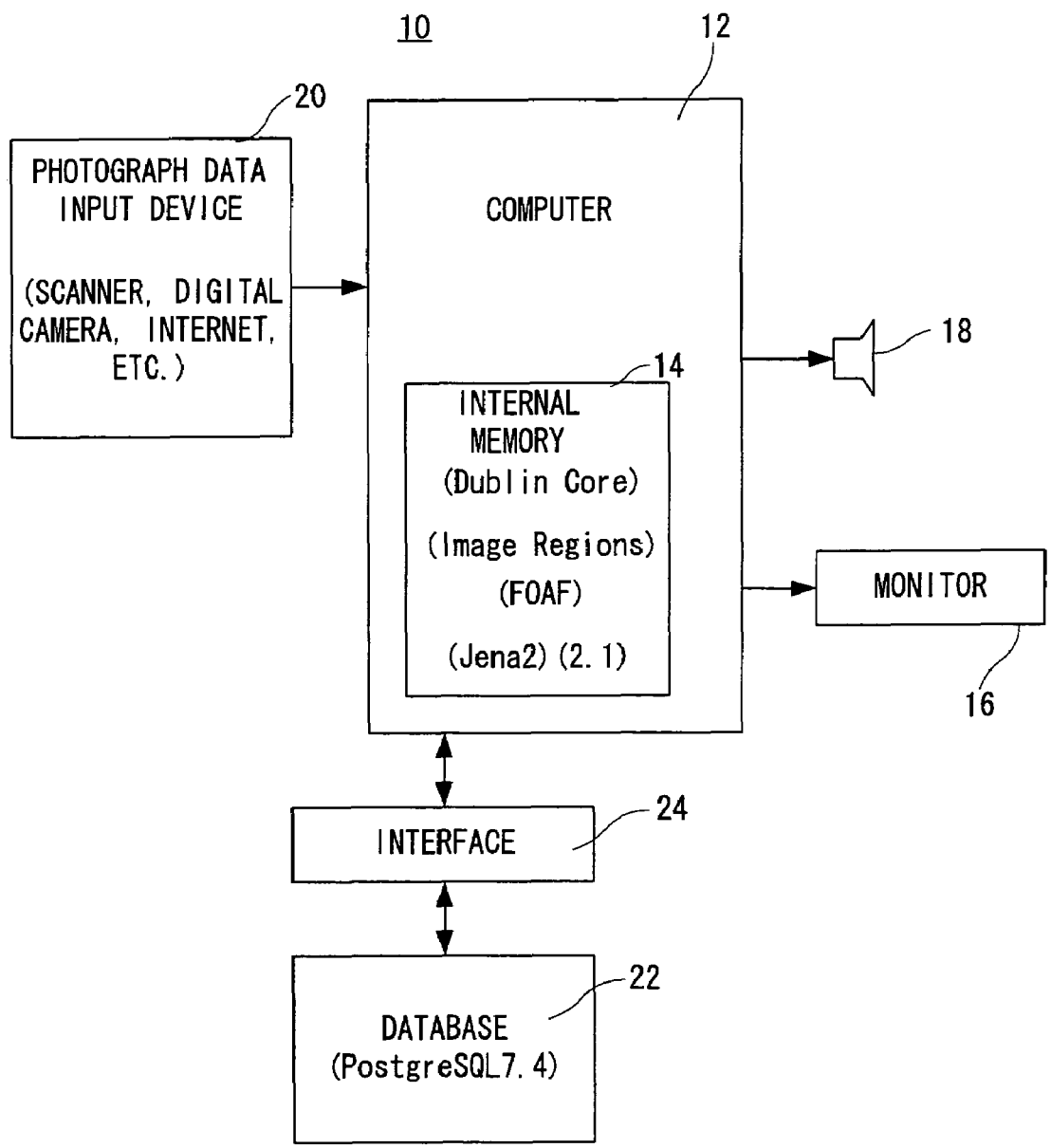
FIG. 1 is a block diagram showing a video content creating apparatus in one embodiment of the present invention.

Referring to FIG. 1, a video content creating apparatus 10 of this embodiment includes a computer 12. Personal computer and workstations are applicable to the computer 12.

The computer 12 is provided with an internal memory 14 such as hard disk and RAM. Set in the internal memory 14 are tools for meta-information input, for example, Dublin Core (http://dublincore.org), Image Regions (http://www.w3.org), FOAF (http://www.foaf-project.org), Jena2 (2.1) (http://jena.sourceforge.net), etc., which are all names of vocabularies or software programs. These tools all function as a means for inputting, registering or adding meta-information related to photographic image data.

The meta-information here denotes structured information relating to data. In the case of the embodiments, it shows information that describes structurally the details of photographic image data to be handled.

Dublin Core is known as a typical vocabulary for handling the meta-information. Also, Image Regions is employed to designate areas containing persons' faces and objects in photographs (hereinafter referred to as "regions") and keep them as meta-information. In the case of a region containing a person, the meta-information on the person is added by means of FOAF. Regions are used to add to a photograph as a still image such effects as a zoom-in on the image and a pan between the regions. Jena2 (2.1) is used for storage of meta-information in the RDF form in a database.

Although not illustrated, the computer 12 incorporates a graphic board or processor, and a sound board or processor. Through these components, GUI screens or other graphics (video images) are displayed on a monitor 16, and also such sounds as BGM are output from a speaker.

The computer 12 is also connected with a photographic data input device 20. The photographic data input device 20 includes at least one of an image scanner, digital camera and the Internet (web). The image scanner scans the past photographs of a dementia patient and inputs color or monochrome photographic image data. The digital camera may be used to shoot photographs and input photographic image data for the photographs in real time, and also may be used to shoot past photographs and input photographic image data for the photographs. The Internet can be utilized to input the photographic image data for the past photographs of a dementia patient that is transmitted from a remote location, and also capture photographic image data on some events related to the dementia patient's past life. Moreover, other kinds of photographic input devices may be employed.

Besides, the computer 12 is connected with a database 22 via an interface 24. In this embodiment, a relational database called PostgreSQL 7.4 (http://www.postgresql.org) is used as database 22.

As a matter of course, the computer 12 has input means including a keyboard and a mouse, although they are not illustrated.

Figure 2:
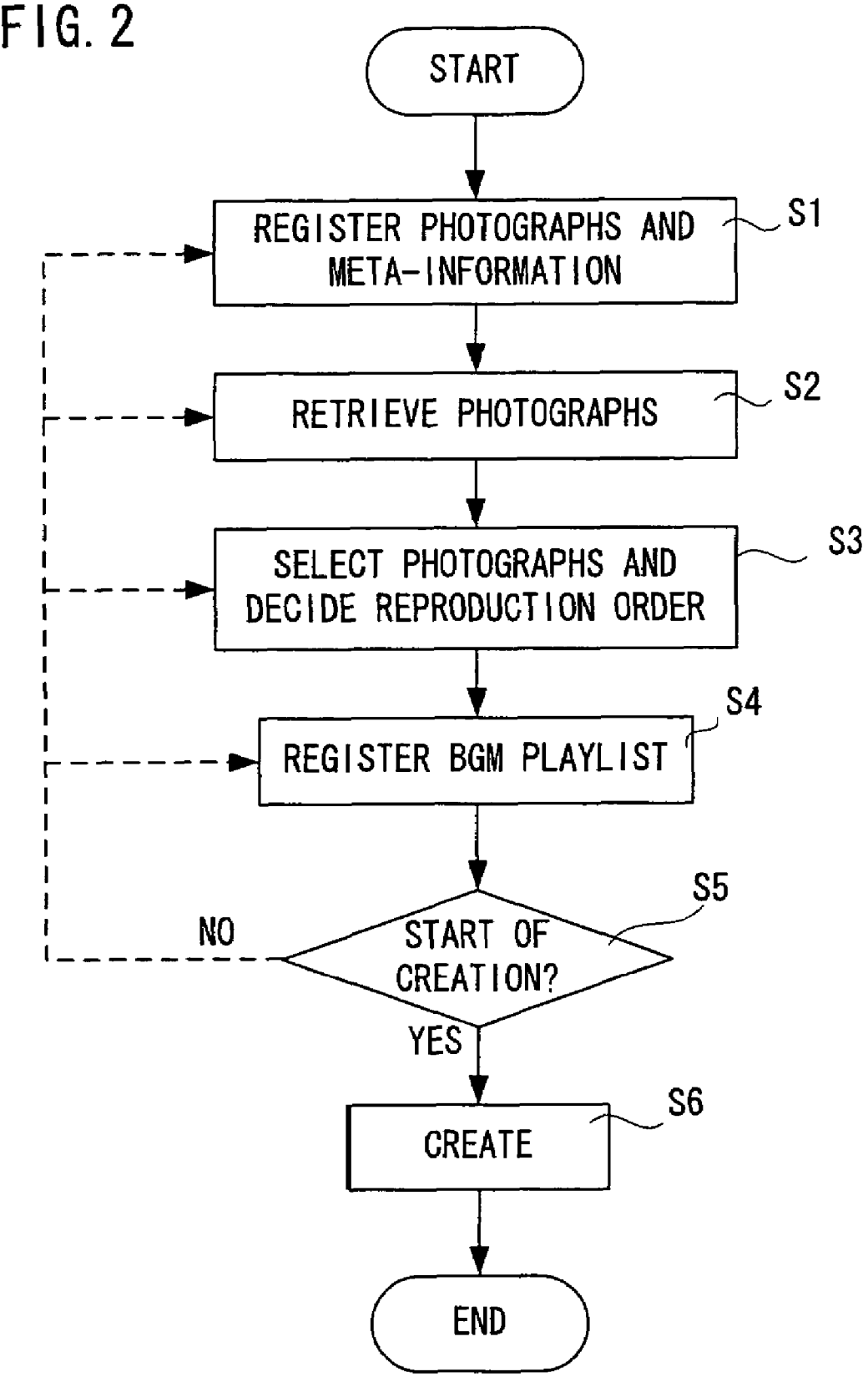
FIG. 2 is a flowchart showing overall operation of the FIG. 1 embodiment.

In order to create a reminiscence video by using the video content creating apparatus 10 of the FIG. 1 embodiment, the computer 12, etc. operate according to a procedure shown in FIG. 2.

Firstly, in a step S1, photographic image data is input and meta-information is registered. More specifically, the photographic data input device 20 of FIG. 1 is used to input mainly the photographic image data for the past photographs of the dementia patient to the computer 12.

Figure 3:
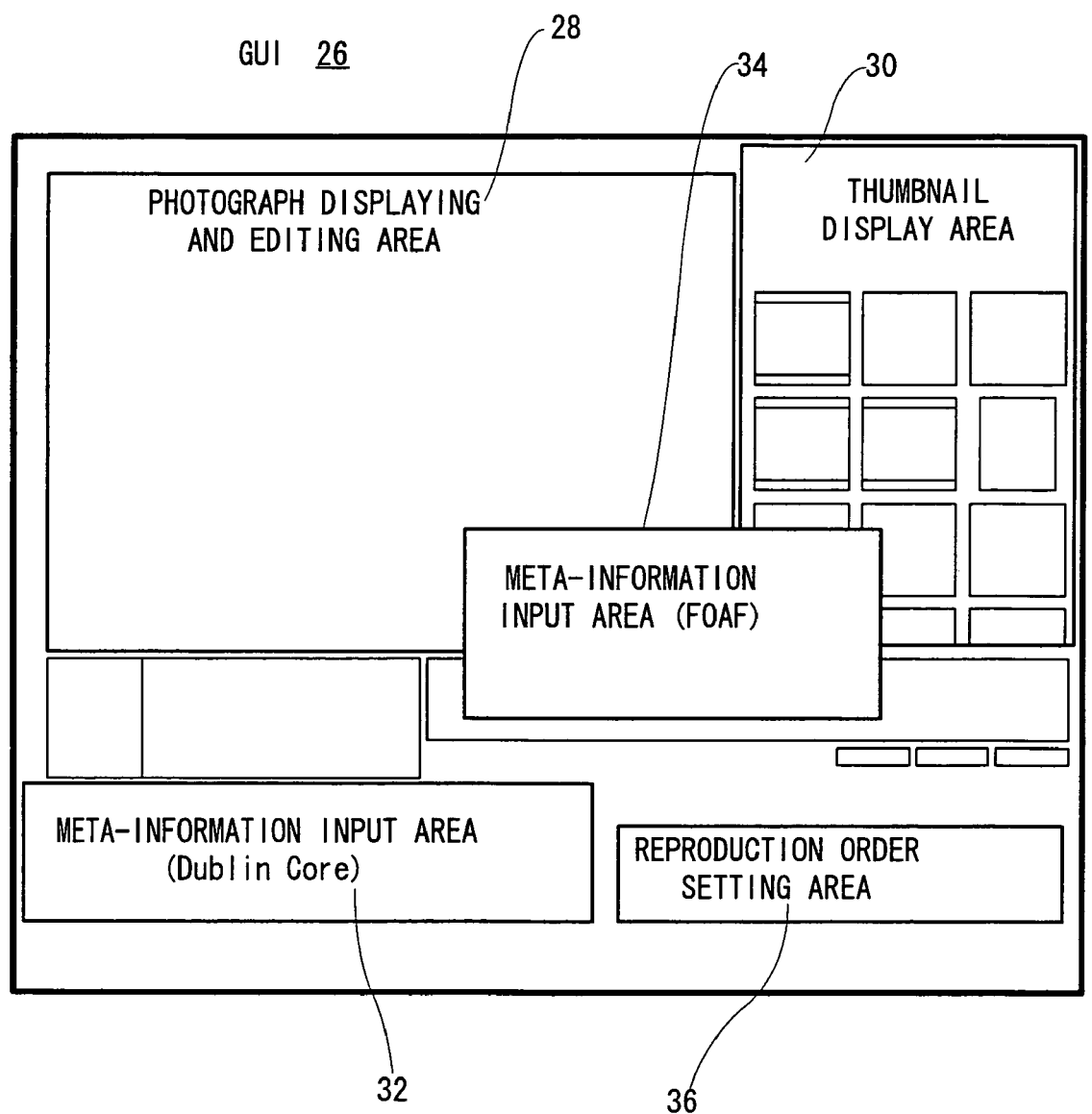
FIG. 3 is an illustrated view showing one example of GUI of the FIG. 1 embodiment.

At that time, a GUI (Graphical User Interface) 26 shown in FIG. 3 appears on the monitor 16. The GUI 26 contains a photograph displaying and editing area 28 that accounts for the major portion of left side of the monitor screen. The photograph displaying and editing area 28 is utilized to display the photographs represented by the input photographic image data and carry out such editing tasks as region designation. The GUI 26 contains a thumbnail display area 30 formed on the right side of the monitor screen. The thumbnail area 30 displays thumbnail images so that photographs to be used can be selected from the photographic image data input and retrieved as described later.

The GUI 26 is provided with a first meta-information input area 32 formed in the lower portion of the monitor screen, a second meta-information input area 34 formed in the approximately center of the monitor screen, and a reproduction order setting area 36 formed in the right lower portion of the monitor screen. The meta-information comprehensively related to the photograph and defined by Dublin Core is input to the meta-information input area 32, which is also displayed in the area 28. The meta-information input area 34 is an area that pops up at the time of an input operation, and is used to input the meta-information by means of FOAF in the case of the region containing a person. The reproduction order setting area 36 is used to set the reproduction order of the photographs captured on the reminiscence video, and the reproduction order can be changed in a drag-and-drop manner as described later.

Figure 4:
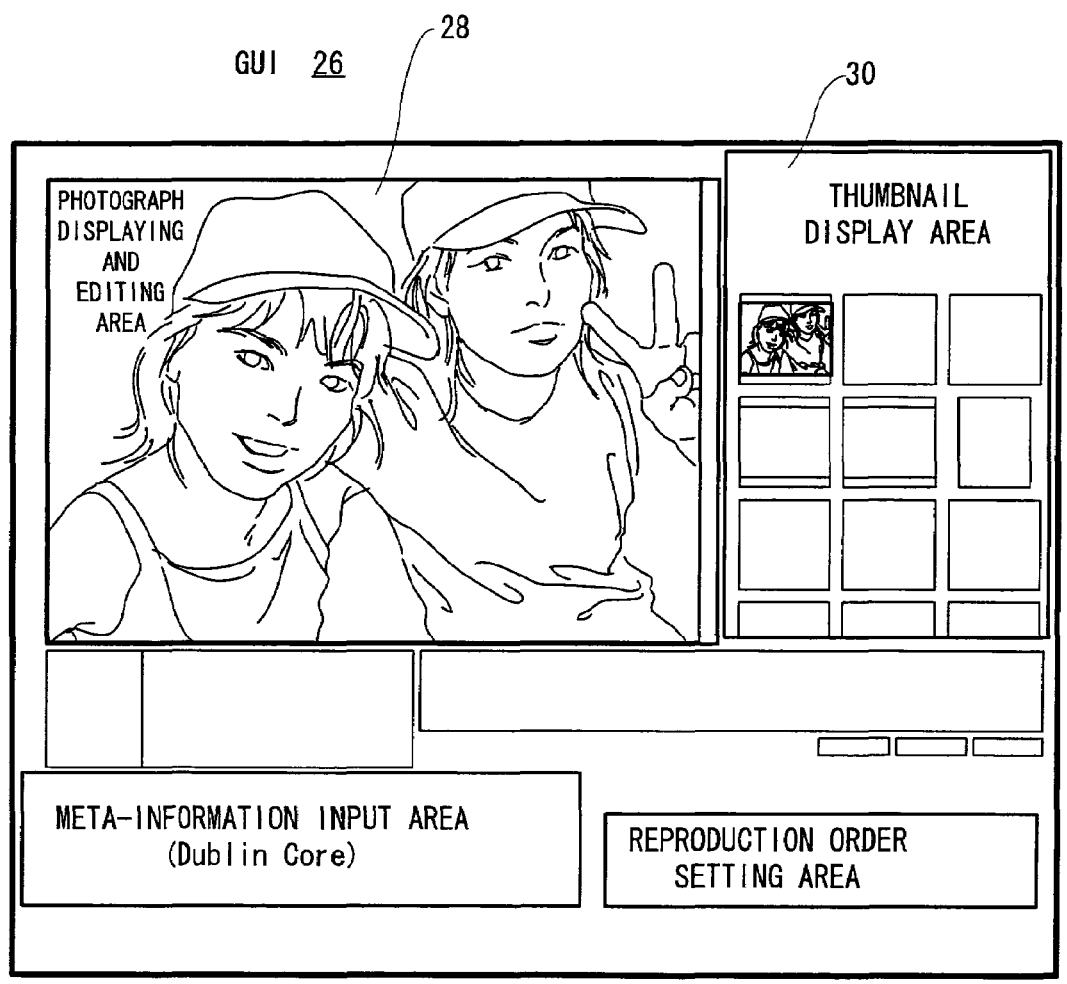
FIG. 4 is an illustrated view showing one example of display of the GUI at the time of photograph input and meta-information registration, which is used in a step S1 described in FIG. 2.

The photograph input and meta-information registration of the step S1 are described below in detail. Referring to FIG. 4, when a photograph as shown in FIG. 4 (this figure depicts a photograph in line drawing. The same applies to the other figures.) is input, the computer 12 displays the photograph (still picture) expressed by image data in the photograph displaying and editing area 28 of the GUI 26 on the monitor 16. In addition to that, the computer 12 displays a thumbnail image of the photograph in the thumbnail display area 30.

Figure 5:
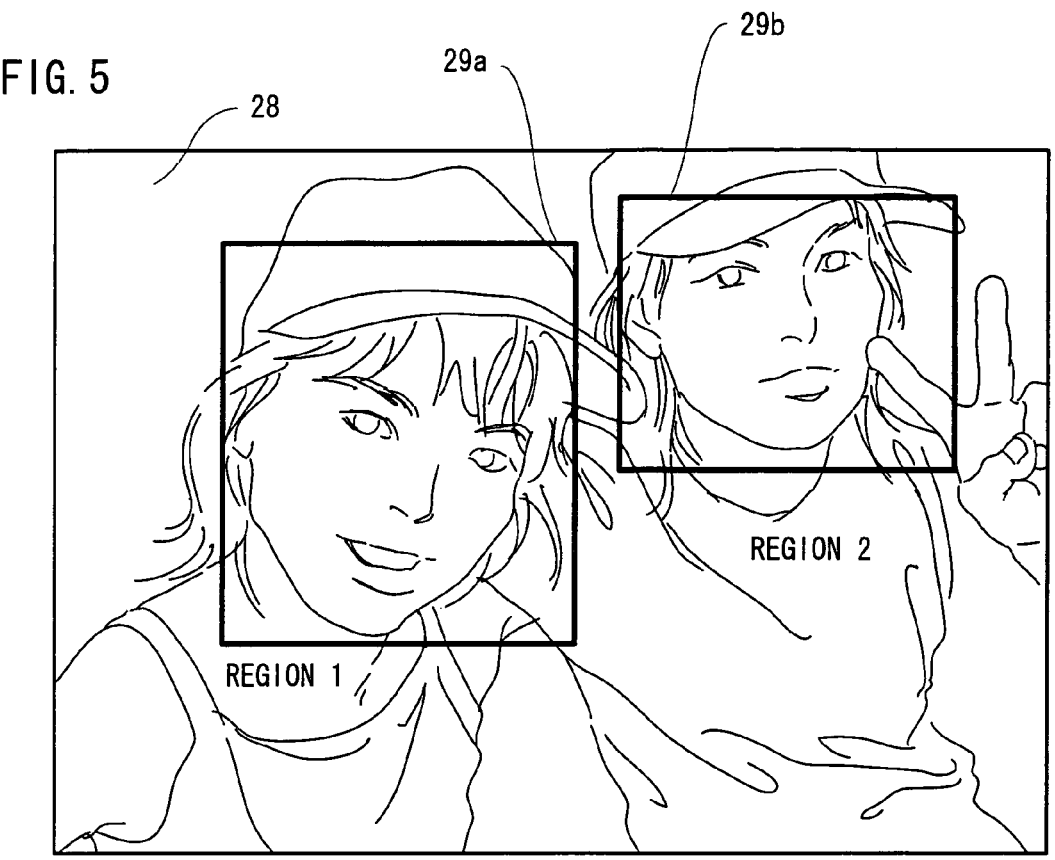
FIG. 5 is an illustrated view showing cut regions in the GUI of FIG. 4.
Figure 6:
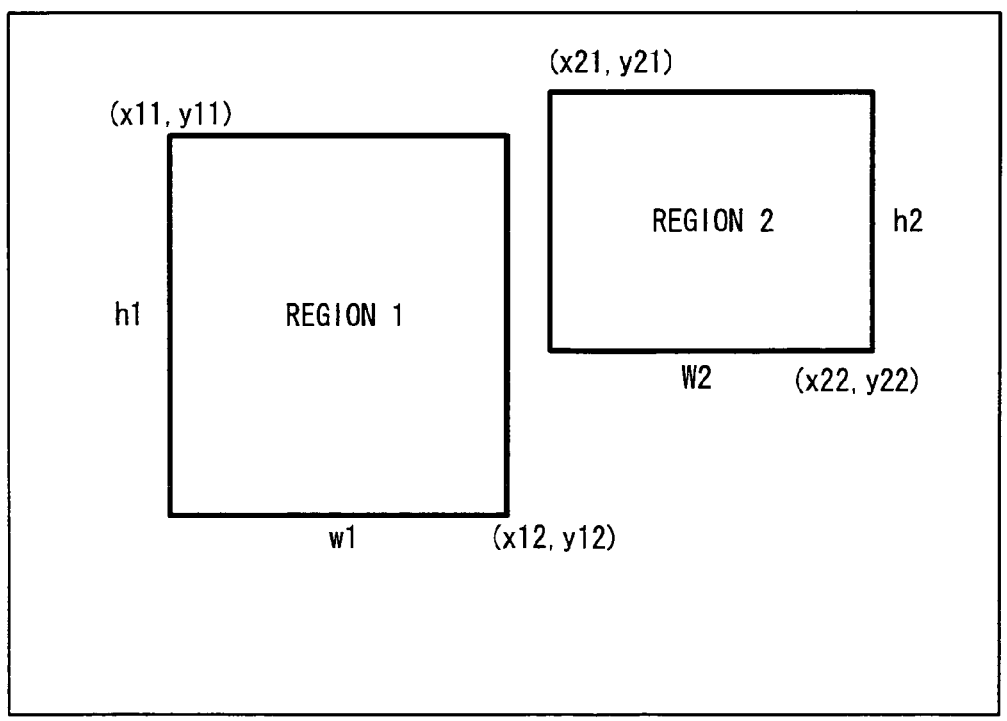
FIG. 6 is an illustrated view showing meta-information of the regions of FIG. 5.

Then, when two regions, region 1 and region 2, are established in the photograph by means of a mouse or the like not illustrated, rectangular frames 29a and 29b specifying the region 1 and region 2, respectively, appear in the photograph displaying and editing area 28, as shown in FIG. 5. By designating the region 1 and the region 2, the meta-information of each region is set in the format defined by Image Regions, as shown in FIG. 6. More specifically, the coordinates (x11, y11) of an origin point of the region 1 (the upper left corner of the rectangular frame) and the coordinates (x12, y12) diagonal thereto are registered, and height h1 and width w1 of the region 1 are also registered as meta-information. Likewise, the origin-point coordinates, diagonal coordinates, height and width of the region 2 are also registered as x21, y21, x22, y22, h2 and w2, respectively.

Figure 7:
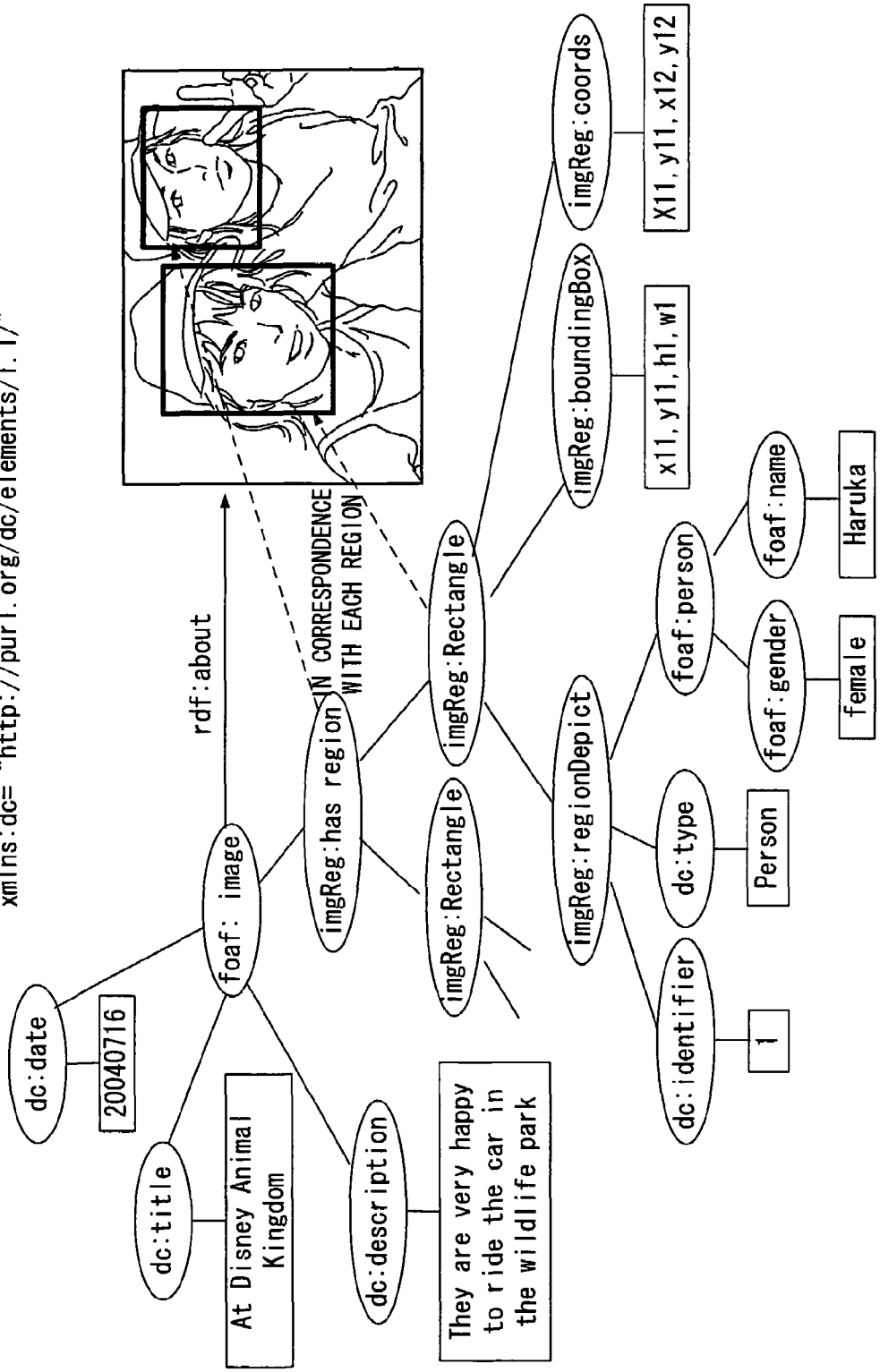
FIG. 7 is an illustrated view exemplifying a relationship between the photograph and the meta-information.

By inputting the photograph and registering the meta-information in the step S1 as stated above, a database is formulated as shown in FIG. 7, for example. Drawn on the right side of FIG. 7 is the photograph displaying and editing area 28 in which the actual photograph shown in FIG. 5 is displayed and the regions are designated. The data in the rectangles linked to the oval frames with the characters "dc:" inside is the meta-information registered by Dublin Core. For example, the date "20040716 (Jul. 16, 2004)" is registered under "dc:date", the title "at Disney Animal Kingdom" is registered under "dc:title", and the caption "They are very happy to ride the car in the wildlife park" is registered under "dc: description" as meta-information. Also, the region number ("1" in the example) is registered under "dc:identifier" and the type of photograph in the region ("person" in the example) is registered under "dc:type".

The meta-information with the character "imgReg:" in the oval frame is the meta-information that is formed when the region is designated by means of Image Regions. The meta-information under "imgReg: has region" indicates that some region is established, the meta-information under "imgReg: Rectangle" denotes that the region is a rectangle, the meta-information under "imgReg:regionDepict" describes the region and the meta-information under "imgReg: boundingBox" includes the origin point position and size of the region (height h, wide w). The meta-information under "imgReg: cords" shows the coordinates of an origin point position and diagonal position of the region. In addition, the meta-information provided under "foaf:" includes, if the region covers a person, the gender ("female" in the example), name ("Haruka" in the example), etc. of the person.

The meta-information shown in FIG. 7 is expressed as follows:
xmlns:imgReg=http://www.w3.org/2004/02/image-regions#
xmlns:foaf=xmlns.com/foaf/0.1
xmlns:dc=http://purl.org/dc/elements/1.1/

When the photograph input and the meta-information registration are thus carried out in the step S1 of FIG. 2, the computer 12 stores the photograph and the meta-information added thereto in the database 22. The above description is on one photograph and the meta-information thereof. Every time photographic image data is input by the input device 20, the meta-information as shown in FIG. 7 is registered and the photographic data with the meta-information is stored in the database 22 in the same manner.

After that, in a step S2 of FIG. 2, a photograph to be used for now is retrieved from the photographs input in the step S1. For the photograph search, the above described meta-information is utilized. For example, the following criteria may be employed for the photograph retrieval by use of the meta-information.

In using FOAF, firstly, if the type of a region is a person, the meta-information for identifying the person is to be added. Thus, the FOAF meta-information can be used to search for a "photograph of the specific person". It is possible to search for multiple persons at the same time, and in this case, the target is a photograph that contains all the persons whose names are specified in the search.

In the case of using the Dublin Core meta-information, the photograph search can be carried out by the "date of photography". For example, under the criterion "From (a first designated date) To (a second designated date)", it is possible to search for all the photographs taken from the first designated date to the second designated date. Under "From (a designated date)", all the photographs shot on the designated date or later can be searched for. Likewise, under "To (a designated date)", it is possible to search for all the photographs taken on the designated date or earlier. In addition, it is possible to retrieve a "photograph with a specific value in a specific property", for example, a photograph with the characters "Disney" under "dc:title". More than one photograph can be selected or searched for. If a plurality of photographs are selected, the target is only the photograph(s) that satisfy the set search criteria at the same time.

Figure 8:
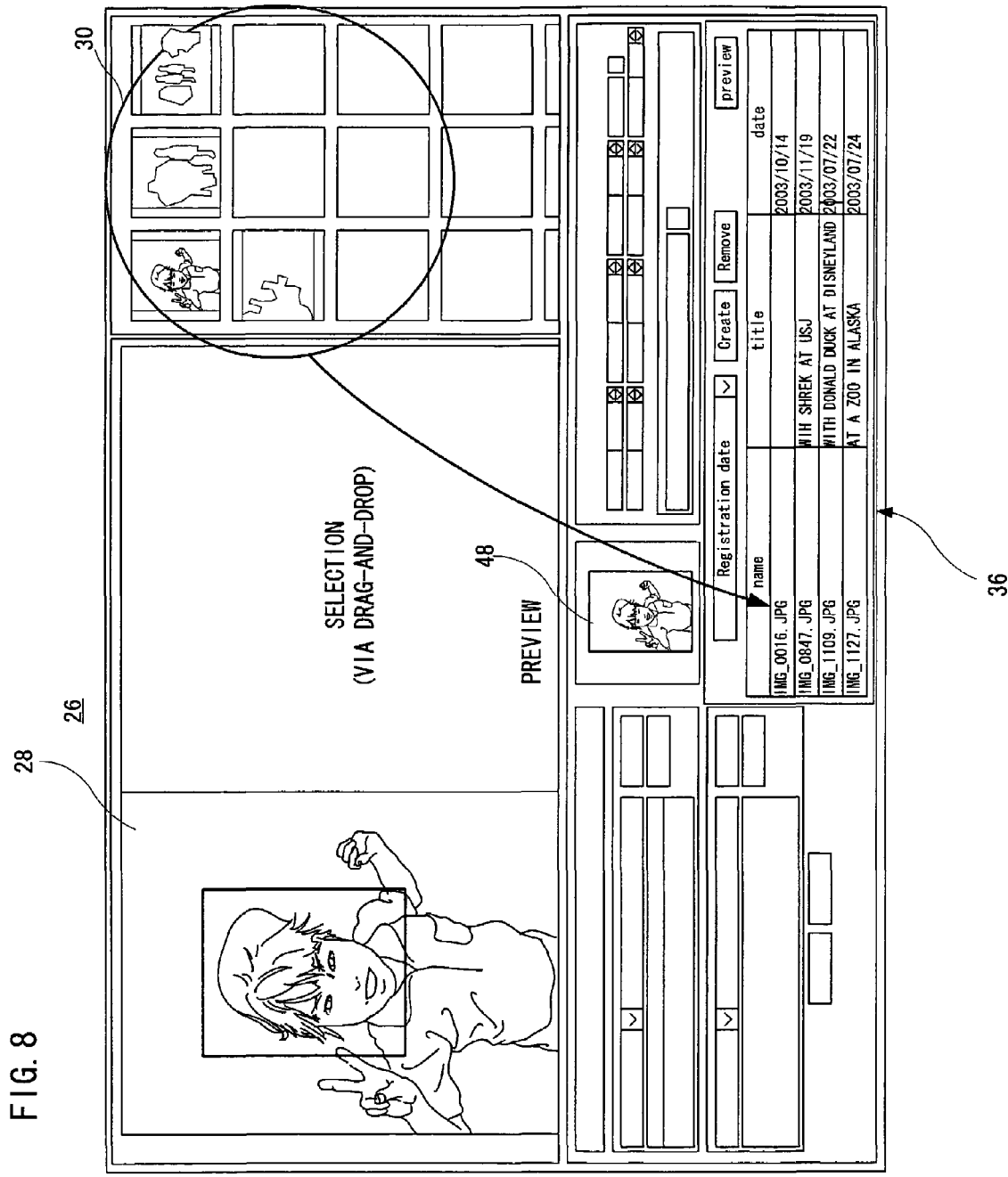
FIG. 8 is an illustrated view showing one example of GUI at the time of photograph selection and reproduction order setting operation in a step S3 of FIG. 2.

Upon completion of photograph selection in the step S2 as stated above, photographs to be actually used are selected from the retrieved photographs in a step S3. If a plurality of photographs are selected, the reproduction order of the plurality of photographs is designated or decided. The GUI 26 for the step S3 is shown in FIG. 8. It should be noted here that FIG. 8 uses a photograph different from that shown in FIG. 7 and earlier ones for the sake of convenience.

Figure 9:
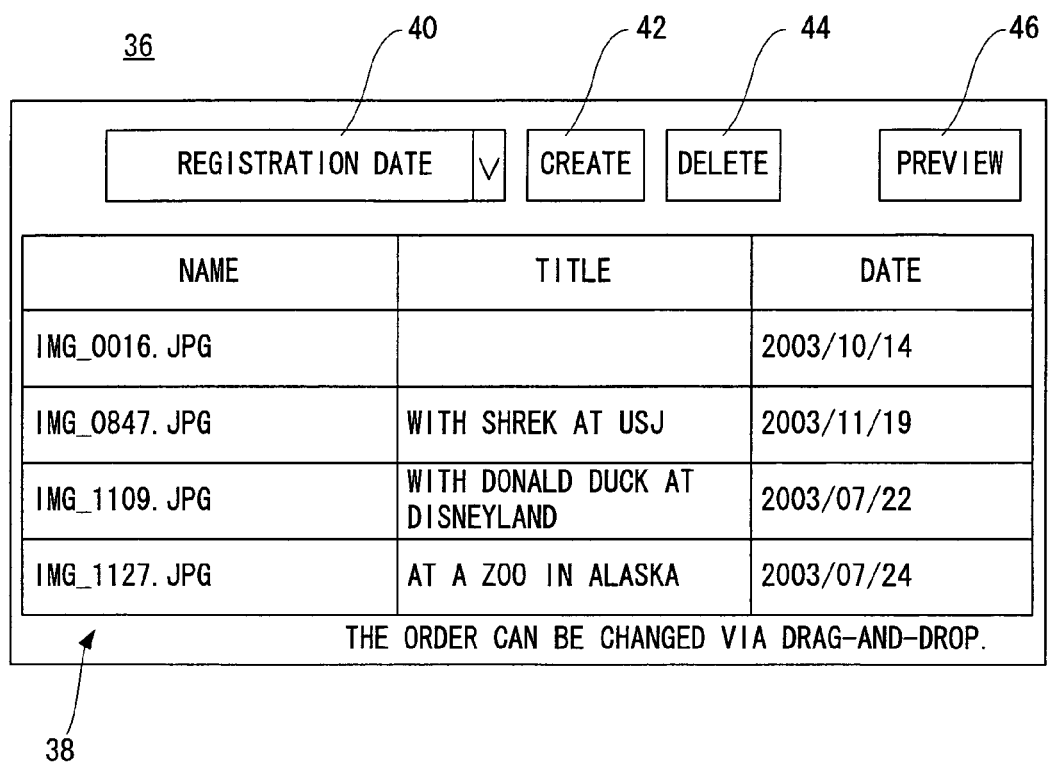
FIG. 9 is an illustrated view showing a reproduction order setting area in the GUI of FIG. 8.

When the step S3 is selected from a menu not illustrated, the computer 12 displays the GUI 26 as shown in FIG. 8 on the monitor 16. In the GUI 26 of FIG. 8, the reproduction order setting area 36 also shown in FIG. 3 is formed in the lower right portion of the monitor screen. FIG. 9 presents an enlarged drawing of the reproduction order setting area 36.

The reproduction order setting area 36 includes a photograph list section 38. As shown in FIG. 8, a photograph to be used can be selected by dragging and dropping as indicated by the arrow a thumbnail image displayed in the thumbnail display area 30 into the photograph list section 38. That is, all the thumbnail images for the photographs retrieved in the photograph retrieving step S2 are displayed in the thumbnail display area 30, which makes it possible to select a desired photograph from the overview of images by dragging and dropping the photograph into the photograph list section 38. Moreover, the photograph list section 38 has columns for name, title and date.

In addition, as shown in FIG. 9, the reproduction order setting area 36 is provided with a sort designation section 40, a create button 42 for designating the creation of a slide show of reminiscence video, a delete button 44 used for deletion of a photograph, and a preview button 46 to be pressed (clicked) for preview of a selected photograph. By pointing a cursor at any one of the photographs in the photograph list section 38 and operating the preview button 46 in that state, a preview image is displayed in a preview area 48 shown in FIG. 8.

Besides, some property for sorting the selected photographs, such as the registration date, is set in the sort designation section 40. When a specific property is set in the sort designation section 40 from a pull-down menu, for example, the computer 12 sorts the photographs in ascending order of value with respect to the property.

Moreover, the photographic images are reproduced in the order of a photograph list registered in the photograph list section 38. Thus, if desired, the list registration order, i.e. the reproduction order can be changed by moving one line in the photograph list section 38 in a drag-and-drop manner.

Subsequently, in a step S4 of FIG. 2, a playlist of BGM to be put on at the reproduction of photographs is registered or selected. In this embodiment, MP3 music files, for example, are supported, and, by registering a music number to be used as BGM on the playlist, the BGM is reproduced according to the playlist. Also, with the use of M3U format, for example, it is possible to use a playlist as it is that is prepared by a general software application such as Winamp (application name).

Figure 10:
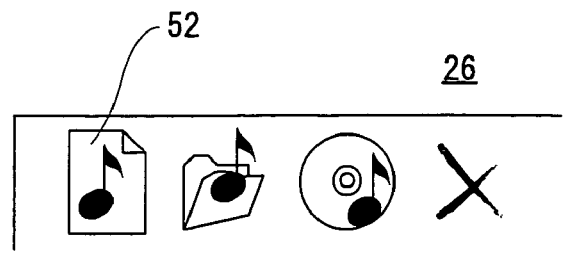
FIG. 10 is an illustrated view showing a part of the GUI at the time of playlist creation in a step S4 of FIG. 2.
Figure 11:
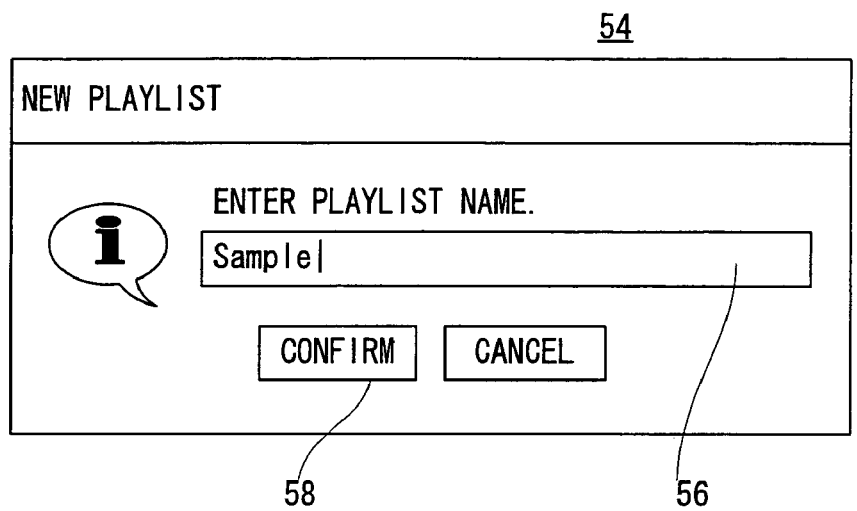
FIG. 11 is an illustrated view showing a new playlist registration section formed in the GUI of FIG. 8.
Figure 12:
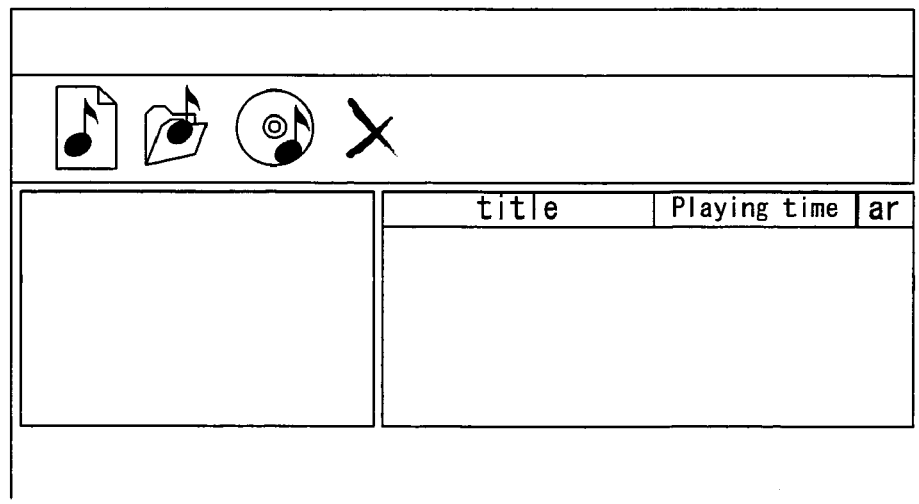
FIG. 12 is an illustrated view showing a part of the playlist formed in the GUI of FIG. 8.

In the step S4, firstly, the item "playlist selection or registration" is selected from a menu not illustrated. Then, the GUI 26 as shown in FIG. 10 is displayed on the monitor 16. By clicking on a playlist create button 52 in the GUI 26, a new playlist registration section 54 appears as shown in FIG. 11. Formed in the registration section 54 are a name section 56 for setting the name of a playlist ("Sample" in the example of the figure) and a decide (confirm) button 58 for confirming the input name. By inputting a name to the name section 56 and clicking the confirm button 58, an empty playlist 60 is displayed as shown in FIG. 12.

Figure 13:
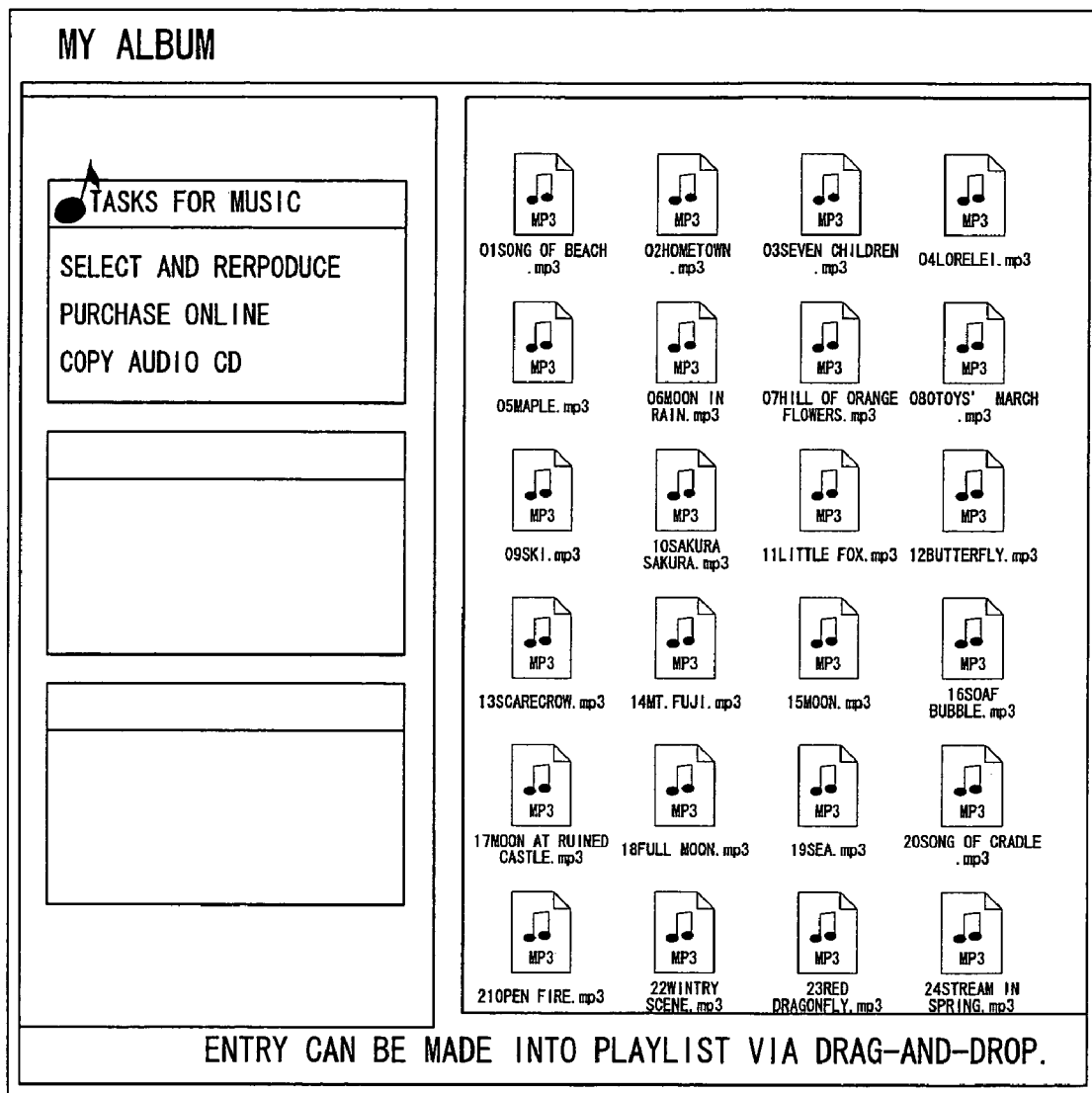
FIG. 13 is an illustrated view showing one example of an overview of music numbers used for playlist registration.

By displaying an MP3 file overview 62 as shown in FIG. 13 and dragging and dropping an appropriate music number from the overview into the playlist 60, it is possible to select or register the music numbers to be used as BGM in succession on the playlist 60. In the example of the figure, the music number overview 62 named "My album" is used and mainly children's songs are selected therefrom.

As stated above, when the photographic data input, meta-information registration, photograph retrieval and selection, music number selection are carried out and the create button 42 as shown in FIG. 9 is pressed, the creation of a reminiscence video is started. Therefore, in a step S5 of FIG. 2, it is determined whether the create button 42 is clicked or not. If "YES", the process proceeds directly to a next step 6. If "NO", it is possible to return an arbitrary one of the steps S1 to S4 to resume the relevant operation.

In other words, it is possible to perform each of the steps S1 to S4 of FIG. 2 any number of times, at any time and by any workload, through making a selection from the menu. Thus, the operator may perform a required amount of required task when time permits. In any case, the results of tasks performed until the last time are stored in the database 22, and for a task this time, the data on the tasks done until the last time is read out from the database 22 and then an operation continuing from that or an operation for making a change to that is carried out.

Then, when it is detected in the step S5 that the create button 42 is turned on, a slide show of reminiscence video (RVML) is created.

Here, "RVML" is a kind of XML designed for complete representation of swf. All versions of swf moving images can be represented as RVML. However, swf is basically composed of only tag strings except file headers having such information as Flash version and frame rate. For example, one frame is the equivalent of a pattern in which a graphic form is defined by a definition tag and positioned in a frame by an operating tag, and then the current frame is drawn by a display tag on the screen. This pattern is repeatedly implemented.

Then, a reminiscence video can be created in Flash movie format from the generated RVML by using the Flash tool KineticFusion (http://www.kinesissoftware.com).

Figure 14:
FIG. 14 is an illustrated view showing one example of a registered playlist.
Figure 15:
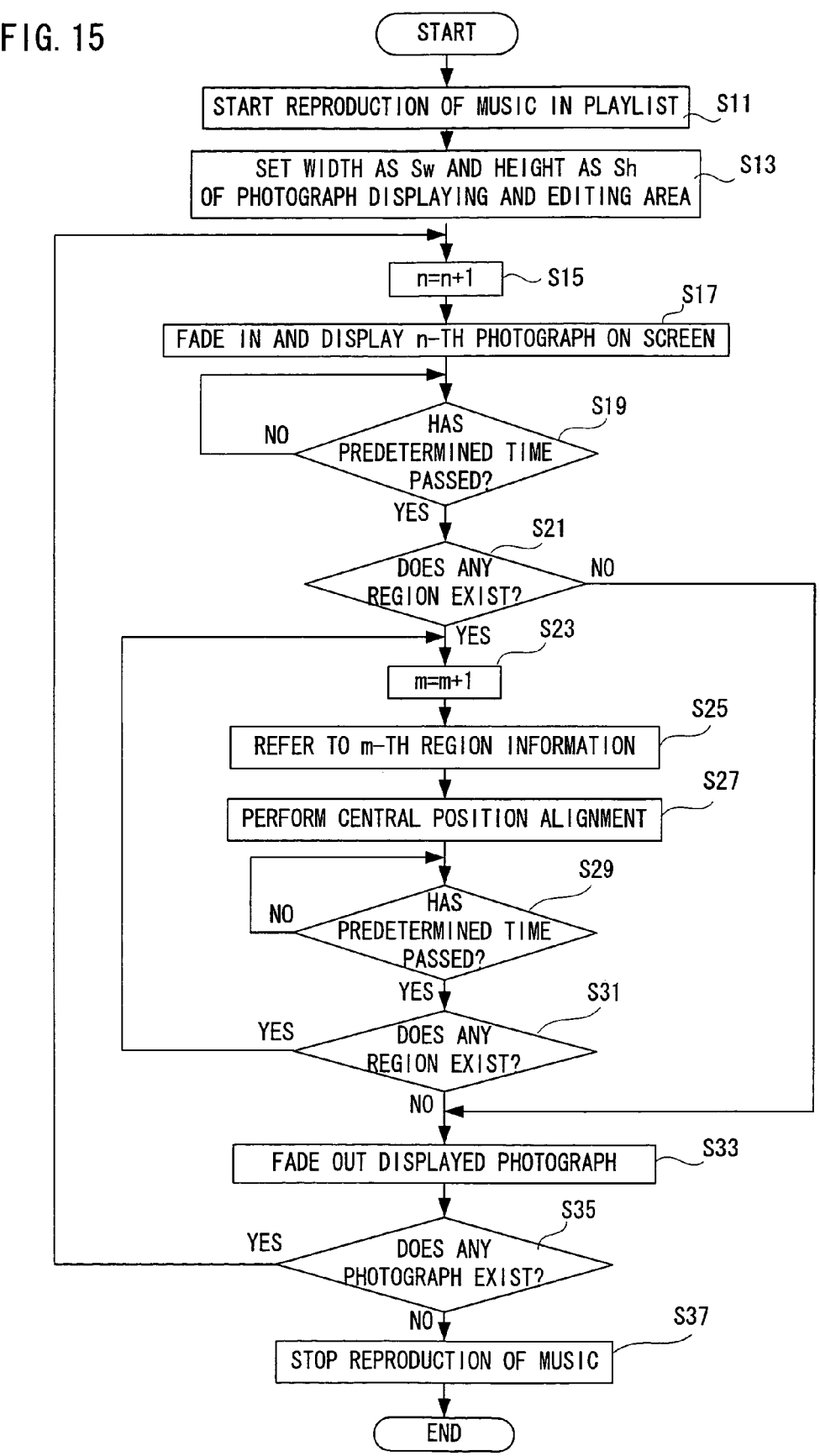
FIG. 15 is a flowchart showing the details of a reminiscence video creating operation in a step S6 of FIG. 2.

More specifically, the reminiscence video creating step S6 of FIG. 2 is performed according to the procedure shown in FIG. 15. In a first step S11 of the procedure, in response to the operation of the create button 42, the computer 12 starts the reproduction of music numbers as BGM on the playlist 60 (FIG. 14). The playlist 60 of FIG. 14 is a list of the music numbers to be pre-registered and reproduced as BGM. Since then, the music numbers are reproduced in order and continuously according to the playlist 60. That is, the computer 12 reads out the music data registered on the playlist 60 and makes the sound board or processor process the data, which allows the music numbers on the playlist to be reproduced from the speaker 18 (FIG. 1).

In a next step S13, the computer 12 sets the width as Sw and height as Sh of the photograph displaying and editing area 28 (FIG. 3) in the GUI 26 formed on the display screen of the monitor 16.

Next, in a step S15, the computer 12 increments the number of photographs n (n=n+1). In a next step S17, a n-th photograph listed in the photograph list section 38 (FIG. 9) is displayed in a fade-in manner in the photograph displaying and editing area 28. More specifically, the computer 12 reads out the n-th photograph in the photograph list section 38 and the meta-information associated therewith from the database 22 (FIG. 1), and displays the n-th photograph. Since n=1 at first, the first photograph is displayed in a fade-in manner. Then, after a predetermined time of pause in a step S19, the computer 12 determines in a next step S21 whether or not any region is designated in the n-th photograph, from the presence or absence of the Image Regions meta-information, for example. If "NO" in the step S21, the process moves to a step S33 described later.

If some region is designated, the computer 12 increments a region number m (m+1) in a next step S23. Then, in a step S25, the computer 12 refers to the Image Regions meta-information on an m-th region. The meta-information includes position data and size data of the m-th region. Thus, in a next step S27, the computer 12 aligns the m-th region in the center of the area 28 by using the meta-information and the preset height Sh and width Sw of the display area.

As an example, assuming that the region's width is w1 and its height is h1 and that the magnification ratio is min [Sw/w1, Sh/h1], the photographic image is moved by dX along a lateral axis and moved by dY along a vertical axis, and magnified by dZ with respect to the display screen 28 on a frame-by-frame basis until the region is aligned just in the center of the display screen 28.

Besides, in the step S27, the image in the region may be aligned not only in the center of the display area but also in another position such as upper left and lower right locations.

Then, after the pause of step S29, the computer 12 determines in a next step S31 whether or not there remains no region. That is, since the number of the regions can be found from the Image Regions meta-information, it is possible in the step S31 to determine whether or not the result of the increment in the step S23 is equal to the actual number of the regions. If any region remains, the process is returned to the previous step S23 to repeat the steps S23 to S31.

If "NO" in the step S31, that is, if all the regions of the n-th photograph has been completely processed in the photograph list section 38, the computer 12 makes the n-th photograph fade out from the photograph displaying and editing area 28 in a next step S33.

Subsequently, in a step S35, the computer 12 determines whether or not there remains no photograph to be processed. That is, since the number of photographs on the photograph list shown in FIG. 9 is known in advance, it is possible in the step S35 to determine whether or not the result of the increment in the step S15 is equal to the actual number. If any photograph still remains, the process is returned to the previous step S15 to repeat the steps S15 to S35. If "NO" in the step S35, the computer 12 stops the BGM in a step S37, and then terminates the process.

As stated above, by editing the photographic image data with use of the related meta-information according to the step S6, i.e. FIG. 15, a series of video contents (reminiscence video) is created (rendered). Then, upon completion of the rendering, the rendering results are stored in the above mentioned RVML format in the internal memory 14 in the computer 12 (FIG. 1) such as a hard disk. The video contents can be also reproduced in another personal computer, etc. by converting them from the RVML to Flash movie formats and storing them in another storage medium. That is, the series of video contents are stored in some storage device or storage medium and utilized for taking care of the dementia patient.

[Evaluation Experiment]

With regard to transitions from photograph to photograph, the inventor et al. conducted preliminary evaluation experiments on the effects of a reminiscence video that had been created by the apparatus 10 of the embodiment with implementation of only fade-in and fade-out. The profiles of test subjects are briefly shown in Table 1.

TABLE 1

Profiles of test subjects

| | Age/gender | Patient record | Symptom | Preference |
|---|---|---|---|---|
| Subject A | 62 Male | Brain contusion in accident | Memory disorder Aphasia Easily angered | Playing a game of go Listening to songs of Hibari Misora (Japanese deceased singer) |
| Subject B | 69 Male | Multiple cerebral infarction | Memory disorder Easily angered | Seeing games of Hanshin Tigers (Japanese baseball team) Singing school songs |
| Subject C | 81 Male | Alzheimer's disease | Memory disorder Easily angered | Train journey Singing school songs |

In the experiments, video clips of four kinds, the test subjects' reminiscences, hobbies and songs that suited to the test subjects' preferences, and some news irrelevant to their preferences, were prepared. The time of each of the clips is 7 to 8 minutes. The facial expressions of the test subjects were recorded on video from the direction of the monitor screen, and their whole bodies were video-shot from backside. Next, the evaluators saw the video images of the test subjects shot during the experiment, and evaluated from a subjective point of view the degrees of the test subjects' concentration or enjoyment on a 1-to-5 scale from the test subjects' facial expressions and physical reactions 1 minute after the start of viewing each of the clips. The evaluators are five persons who have no connection with the test subjects. Table 2 shows an average of the scores given by the five evaluators. The experiment revealed that all the test subjects tended to have a higher degree of enjoyment in their respective reminiscence video than other video contents.

TABLE 2

Evaluation results

| | | Reminiscence | Favorite song | Hobby program | News |
|---|---|---|---|---|---|
| Subject A | Concentration | 4.6 | 4.2 | 4 | 1.2 |
| | Enjoyment | 5 | 4.2 | 3 | 1 |
| Subject B | Concentration | 4.8 | 4.6 | 4.4 | 2.6 |
| | Enjoyment | 4.6 | 4 | 3 | 1 |
| Subject C | Concentration | 3.8 | 2.6 | 2.4 | 3 |
| | Enjoyment | 2.8 | 2.2 | 2.2 | 2 |

Then, another embodiment of the present invention is described below. Prior to a description of operation of this embodiment, the addition of video effects as a feature of this embodiment is explained.

The inventor et al. conducted a hearing from a plurality of video creators having experience in video editing, on conceivable video effects that can be added at the time of conversion from photographs to a reminiscence video (the effect(s) to be added to each of the photographs and transitions from photograph to photograph). The results are as follows in A-1 to A-3 and B-1 to B5.

(A) Effects

A-1: So-called Ken Burns effects (see http://en.wikipedia.org/wiki/KenBurns) such as a zoom-in on and pan across a rectangular area containing a person's face in a photograph.

A-2: Fading out a zoomed-in region, instead of panning it, and fading in the next region.

A-3: Displaying a color photograph in monochrome, and then changing it gradually to color display.

(B) Transitions

B-1: Fading out a preceding photograph while fading in the next photograph, and then making them overlap each other.

B-2: Sliding the next photograph in.

B-3: Dissolving the preceding photograph and shifting to the next photograph.

B-4: Bringing the preceding photograph to page peel (the photograph is turned from its right lower corner) and shifting to the next photograph.

B-5: Making the preceding photograph rotate around a central vertical, and changing to the next photograph.

Based on the above results, a template for rendering a reminiscence video was created as shown in Table 3. With items listed in the "Used information" section of Table 3 as annotations (also called "meta-information"), this template is designed as annotation ontology. Employed as a framework to add annotations is Semantic Web (a next-generation web technology for improving search performance and enhancing convenience that uses two technologies "meta-information (additional information for explaining a content) and "ontology" (definition of terminology for describing meta-data)). That is, the annotations are described by use of RDF (Resource Description Framework). This allows for an affinity with the web in information sharing in the case where the user creates a reminiscence video for him/her and his/her family members by using the photographs annotated by a non-family person.

TABLE 3

| Identifier | Requirement for use of effect or transition | Effect or transition | Used information |
|---|---|---|---|
| RT-1 | Amount of vertical movement/horizontal movement of pan between regions is less than (or, equal to or less than) threshold value. | A-1 | Area of person in photograph |
| RT-2 | Amount of vertical movement/horizontal movement of pan between regions is equal to or more than (or, more than) threshold value. | A-2 | |
| RT-3 | Photograph changes from monochrome to color states. | A-3 | Color tone of photograph |
| RT-4 | Effect is to be applied to only region corresponding to subject memorable for the viewer. | A-1 A-2 | Information on person in photograph |
| RT-5 | Age of photograph is older than threshold value. | B-1 | Date of photography |
| RT-6 | Age of photograph is newer than threshold value. | B-5 | |
| RT-7 | Scenario maintains consistency. | B-1 | Date of photography |
| RT-8 | Difference in age between used photographs is less than (or, equal to or less than) threshold value and scenario is in turning point. | B-5 | Event appearing in photograph |

Moreover, in accordance with a policy of using existing vocabulary as much as possible, the inventor et al. described the dates of photography and the events appearing in the photographs by the above mentioned standard vocabulary for bibliographic information, Dublin Core, in the experiments for this embodiment. The inventor et al. also used the above stated vocabulary FOAF as a standard for description of personal information to describe the information on the persons in the photographs. In addition, the inventor et al. used above mentioned Image Region to describe the areas of persons in the photographs. Color tones for the photographs can be obtained from the color space information of Exif (http://it.jeita.or.jp/document/publica/standard/exif/english/jeida49e.htm). For description of relationships with the persons in the photographs (photographic subjects), knows properties are defined by FOAF. However, RELATIONSHIP (http://vocab.org/relationship) with an extension of the attributes of knows properties of FOAF was used here because it was necessary in creating the reminiscence video to define a relationship between the test subject and the photographic subject in more detail. Using these tools, the parent-child relationships, the blood relationships and the like were described. The description sample is presented in FIG. 17 described later.

Furthermore, with respect to the effects and transitions listed in Table 3, the inventor et al. defined the ontology of video effects to be used for the creation of reminiscence videos as shown in Table 4.

TABLE 4

| Effect or transition | Rendering ontology | Description |
|---|---|---|
| A-1 | Zoom | Zoom in on region |
| | Pan | Pan between regions |
| A-2 | RegioOverlap Transition | Fade-in or fade-out between regions |
| A-3 | Mono2Color | Shift from monochrome to color |

TABLE 4-continued

| Effect or transition | Rendering ontology | Description |
|---|---|---|
| B-4 | PhotoOverlap Transition | Photograph transition by fade-in or fade-out |
| B-5 | RotateTransition | Photograph transition by rotation |

Then, the inventor et al. described the rules for the conversion from photograph annotations to video effects, and used them as templates. FIG. 16 shows an example of expression of rendering template for "RT-8" in Table 3. For the other identifiers listed in Table 3 as well, the templates need to be prepared in the same manner.

Here, it is assumed that the rendering template itself is described as a statement of RDF, and that the rendering template is retrieved by means of RDQL above mentioned. In addition, for the rendering ontology, another original format may be defined because there is no special need for interoperability.

In another embodiment of the present invention described below, the above mentioned template as shown in FIG. 16 is used to add the video effects listed in Table 4 (effects or transitions) to video contents named as reminiscence video.

In this embodiment of the present invention, a reminiscence video is created by using the video content creating apparatus 10 of the embodiment shown in FIG. 1, and the basic operation for that is the same as the one already explained with reference to FIG. 2. Therefore, a duplicate explanation is omitted here by applying FIG. 2 and FIG. 3 to FIG. 14 related thereto and the descriptions on these figures. For the details on the meta-information used for description of this embodiment, see FIG. 17 instead of FIG. 7.

Figure 18:
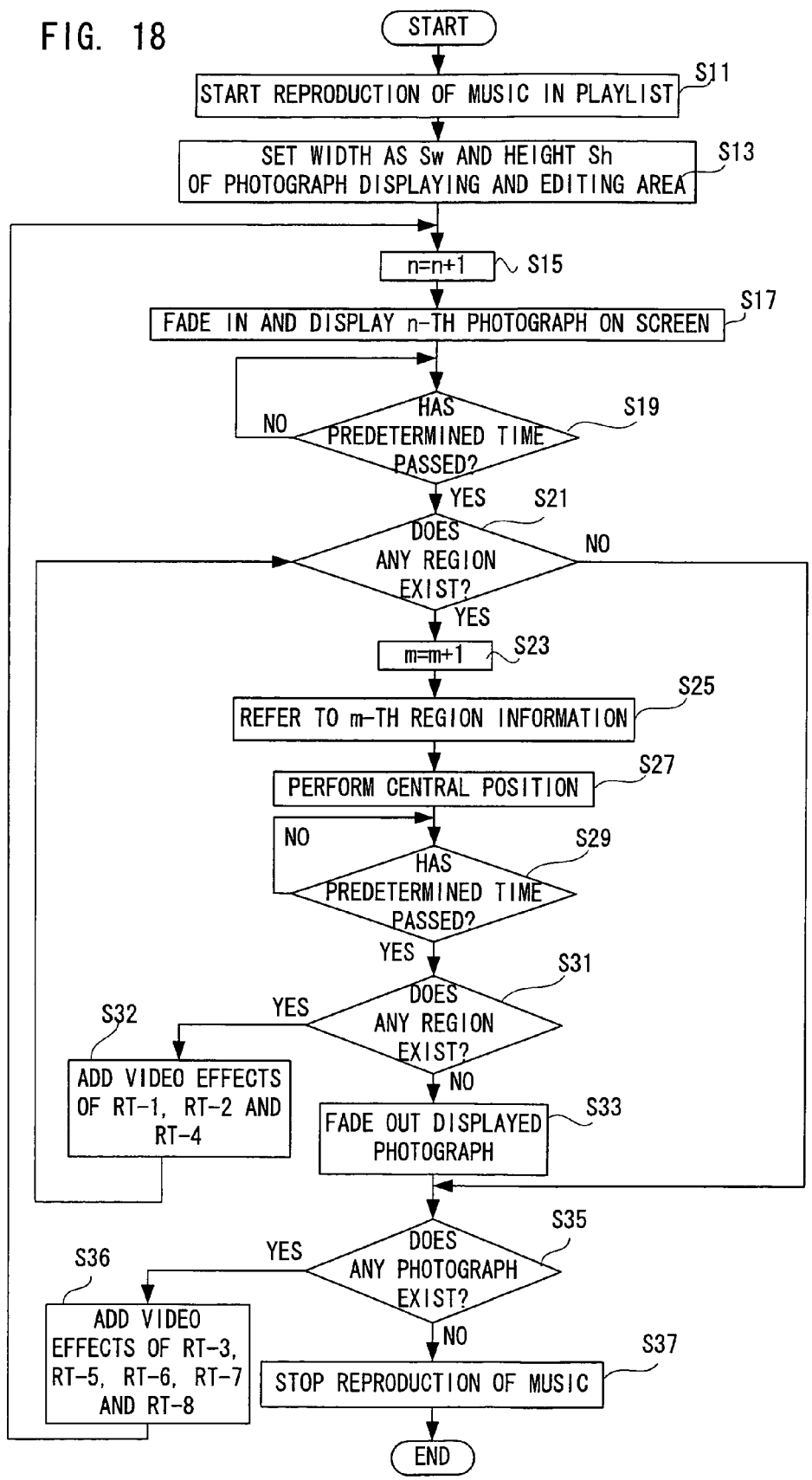
FIG. 18 is a flowchart showing the details of a reminiscence video creating operation in the step S6 of FIG. 2 in another embodiment of the present invention.

In this embodiment, more specifically, the step S6 of FIG. 2 is performed according to the procedure shown in FIG. 18. FIG. 18 is identical with FIG. 15 except that steps S32 and S36 are added to this procedure, and thus a duplicate explanation is omitted below.

If it is found in a step S31 that there remain any region, the computer 12 adds the video effects A-1 and A-2 indicated by the identifiers RT-1, RT-2 and RT-4 listed in Table 3, to the region in a next step S32.

Figure 17:
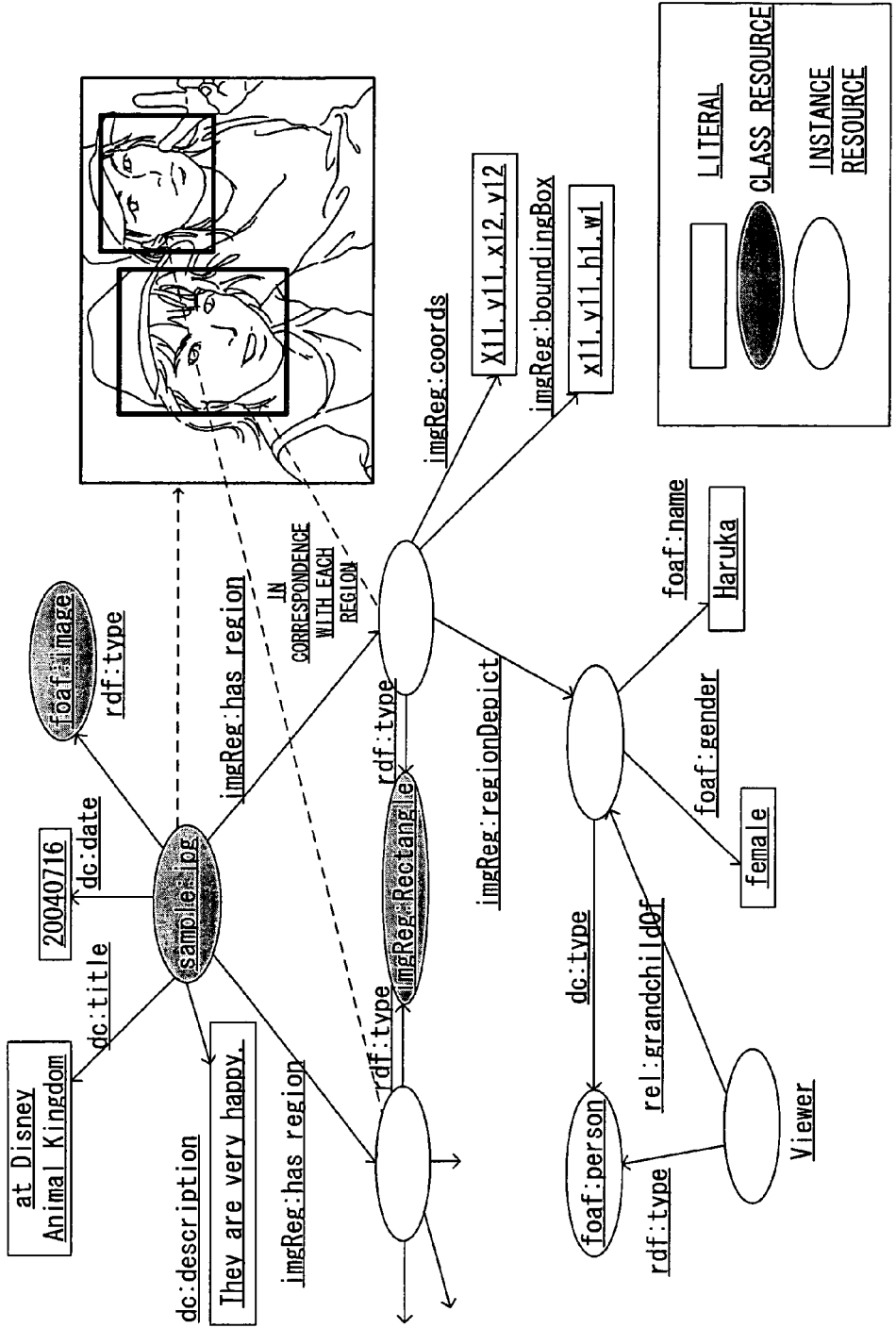
FIG. 17 is an illustrated view showing another example of relationship between the photograph and the meta-information.

More specifically, the computer 12 calculates the spaces between a plurality of regions, X-direction (horizontal) spaces and Y-direction (vertical) spaces, from region coordinate values (imgReg:coords) and region boundary values (imgReg:boundingBox) out of the meta-information as shown in FIG. 17. Then, the computer 12 determines whether these between-regions spaces are equal to or more than (or, more than) or less than (or, equal to or less than) predetermined threshold values. If either X-direction (horizontal) space or Y-direction (vertical) space is less than (or, equal to or less than) the threshold value, the computer 12 uses the Ken Burns effect to zoom in on a region containing a person's face in the photograph, and then pans the next region. On the other hand, if either X-direction (horizontal) space or Y-direction (vertical) space is equal to or more than (or, more than) the threshold value, the computer 12 fades out the zoomed-in region, instead of panning it, and fades in the next region.

In addition, if the photographic subject information indicated with foaf:person as shown in FIG. 17 relates to a photographic subject who is memorable to the viewer, the computer 12 zooms in only on the region of the photographic subject, and then performs pan, fade-out or fade-in according to the between-regions spaces.

However, in order to automatically add the video effects A-1 and A-2 with the identifiers RT-1, RT-2 and RT-4 in the step S32, the conversion template as exemplified in FIG. 16 should be employed.

After that, the process is returned to the previous step S23 to repeat the steps S23 to S32.

If it is found in step S35 that there still remain any photograph to be processed, the computer 12 adds the video effects A-3, B-1 and B-5 indicated by the identifiers RT-3, RT-5, RT-6, RT-7 and RT-8 listed in Table 3, in a next step S36.

More specifically, the computer 12 obtains the meta-information on the color tone of photographs, although not shown in FIG. 17, from the above mentioned Exif color space information, and determines whether or not the color information indicates such a color change by which the preceding photograph is monochrome and the current photograph is colored. If there is any color change information, the computer 12 adds an video effect in which the current color photograph is firstly displayed in monochrome and then changed gradually to color display.

In addition, the computer 12 obtains the data on the date of photography from the meta-information shown in FIG. 17, and calculates a difference in age between the preceding photograph and the current photograph. Then, the computer 12 determines whether the difference of age is equal to or more than (or, more than) or less than (or, equal to or less than) a predetermined threshold value. If the difference of age between the preceding photograph and the current photograph is less than (or, equal to or less than) the threshold value, the computer 12 adds a video effect for fading out preceding photograph while fading in the next photograph and then making them overlap each other. If the difference of age between the preceding photograph and the current photograph is equal to or more than (or, more than) the threshold value, the computer 12 adds a video effect for making the preceding photograph rotate around a central vertical axis and then shifting to the current photograph.

Moreover, the computer 12 determines whether the scenario is consistent or not, by reference to the dates of photography and the events (titles) in the meta-information shown in FIG. 17. For example, the computer 12 may determine whether or not the photographs were captured in order of age, or whether or not, in the case of the same age, the photographs are captured in order of season. Then, if concluded that the scenario is consistent, the computer 12 add a video effect for fading out the preceding photograph while fading in the next photograph, and then making them overlap each other.

Furthermore, if the difference of age between the photographs calculated as described above is less than (or, equal to or less than) the predetermined threshold value and marks a turning point in the scenario, such as entrance into school, marriage and childbearing, the computer adds a video effect for making the preceding photograph rotate around a central vertical axis and then shifting to the current photograph.

However, in order to add a video effect automatically in the step S36, the conversion template as exemplified in FIG. 16 needs to be employed.

As mentioned above, by editing the photographic data through the use of the related meta-information and adding a video effect to the data according to the step S6, i.e. FIG. 18, a series of video contents (reminiscence video) is created (rendered). Upon completion of the rendering, the rendering result is stored in the internal memory 14 (FIG. 1) in the computer 12, such as a hard disk, in the above mentioned RVML format. The video contents can be reproduced in another personal computer, etc. by converting them from the RVML format to the Flash movie format and then storing them in another storage medium. That is, the series of video contents are stored in some storage device or storage medium and used for providing care to the dementia patient.

[Evaluation Experiment]

In order to verify the validity of the annotation ontology and the rendering template, an experiment was carried out for evaluation of impressions about the reminiscence video created according to the rendering template described in Table 3 and the reminiscence video produced by professional creators. This experiment on impression evaluation was based on a questionnaire survey and thus had healthy individuals as test subjects. The following are an overview and results of the evaluation experiment.

At first, three creators who had certain experience in video editing each used about 15 photographic materials to produce a reminiscence video of about five (5) minutes under their individual themes, by means of the Adobe video editing software Premiere (trade name).

Then, each of the creators uses the authoring tool of the embodiment to add the meta-information, such as the dates of the photography, titles and regions, to the above mentioned photographs. They had been notified in advance that the authoring tool employed such rendering techniques as the Ken Burns effect, but they were not permitted to see the images rendered on the basis of the meta-information added by themselves until the completion of the annotation. This is for the purpose of preventing wherever possible the creators from making annotations with assumptions about the rendering results. Then, based on the annotations, they created slide shows (reminiscence video) with video effects in accordance with the embodiment.

Additionally, for comparison, some slide shows were prepared without applying any video effect to the photographs used for the reminiscence videos.

Then, these contents were presented to the test subjects for evaluation of impressions about them. The evaluation method is a questionnaire survey used in the SD method (Toyohiko Iwashita "Measurement of Image by SD Method", Kawashima Shoten). More specifically, the test subjects evaluated these videos on a 1-to-11 scale by using 22 adjectives considered suitable for expressing impressions about the reminiscence videos (e.g. congenial, unsophisticated, distinctive, etc.) and some adjectives in response to the 22 adjectives (e.g. like<=neither like nor dislike>dislike) indicative of impressions to evaluate these video. The video contents were presented to 21 healthy persons as evaluators in order decided so as to have no order effect wherever possible, and the evaluators saw and evaluated these contents one by one. The results of evaluation were analyzed using MANOVA (Analysis of Variance: Krzanowski, W. J. "Principles of Multivariate Analysis", Oxford University Press, 1988.) to determine whether or not there is a significant difference in the above mentioned three impressions about the video contents.

The experiment of impression evaluation revealed that there was no difference in impression on the test subjects between the reminiscence videos automatically created by means of the authoring tool of the embodiment and the reminiscence videos produced by the creators experienced in video editing with the use of the video editing software.

[Evaluation of Effects of Reminiscence Videos on Dementia Patients]

In addition, evaluations were carried out to determine the actual effects of the reminiscence videos automatically created by means of the authoring tool of the embodiment on the dementia patents. These evaluations revealed that the reminiscence videos of the embodiment tended to bring about more concentration and enjoyment to the dementia patients as compared with other contents.

In still another embodiment of the present invention described below, more specifically, the step S6 of FIG. 2 is performed according to the procedure shown in FIG. 19. The procedure of FIG. 19 is identical with that of FIG. 18 except that the steps S19 and S21 of FIG. 18 are changed to steps S18 to S21 here.

To be more specific, in the next step S18, the computer 12 determines whether or not the photographs are provided with narration. If the narration is already added and registered, the computer 12 reproduces this narration in the step S19. Thus, it is possible to check the already registered narration in the step S19.

However, if no narration is yet added, after a predetermined time of pause in the step S20, the process moves to the next step S21 to carry out the following steps.

Figure 19:
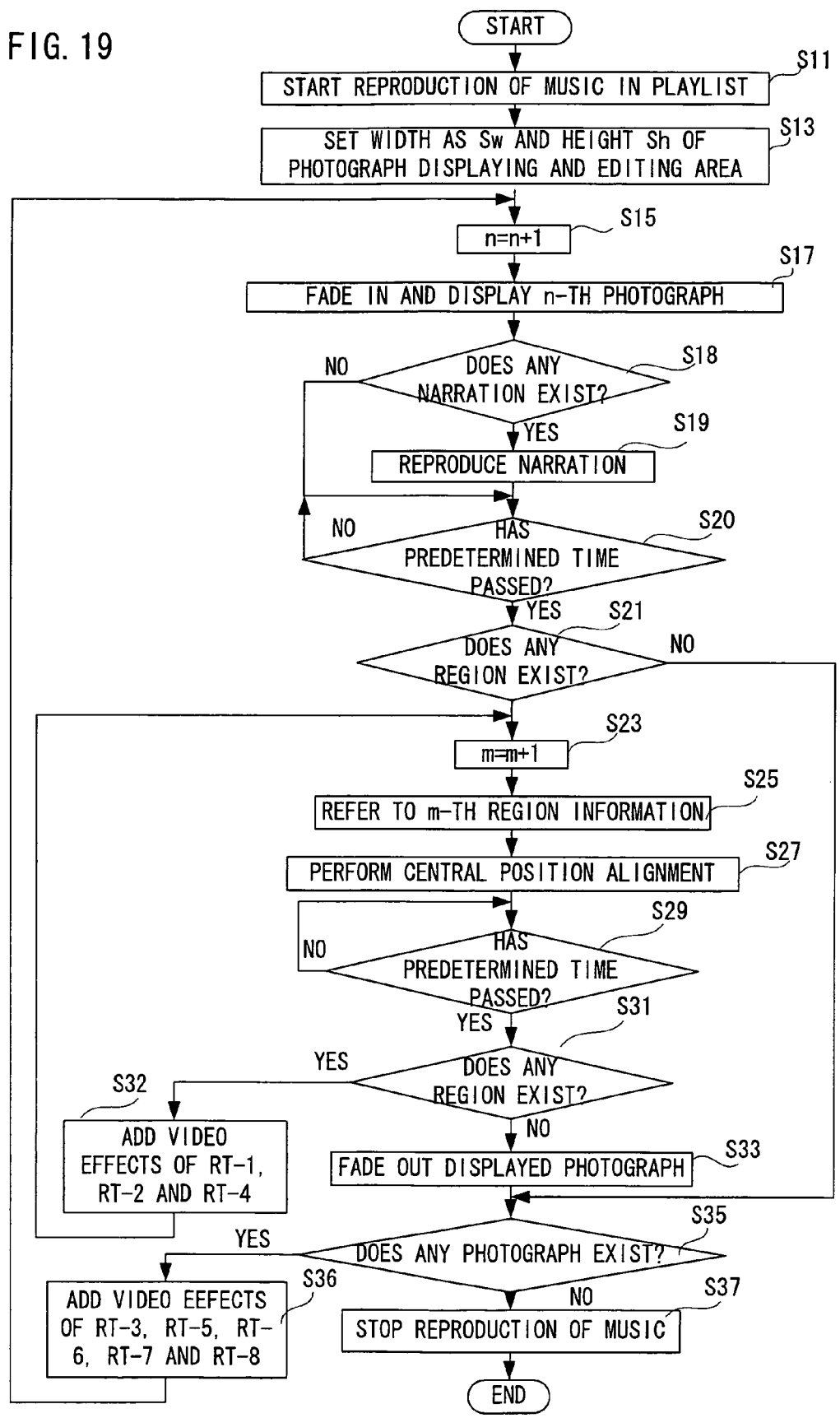
FIG. 19 is a flowchart showing the details of a reminiscence video creating operation in the step S6 of FIG. 2 in still another embodiment of the present invention.

Therefore, in this embodiment as well as the embodiment shown in FIG. 18, a series of video contents (reminiscence video) is created (rendered) by editing the photographic image data with use of the related meta-information and adding some video effects according to the step S6 of FIG. 2, i.e. FIG. 19. Moreover, this embodiment uses the addition of narration. On this account, the GUI 26 is provided with a narration button 31 in this embodiment, as shown in FIG. 20.

Figure 21:
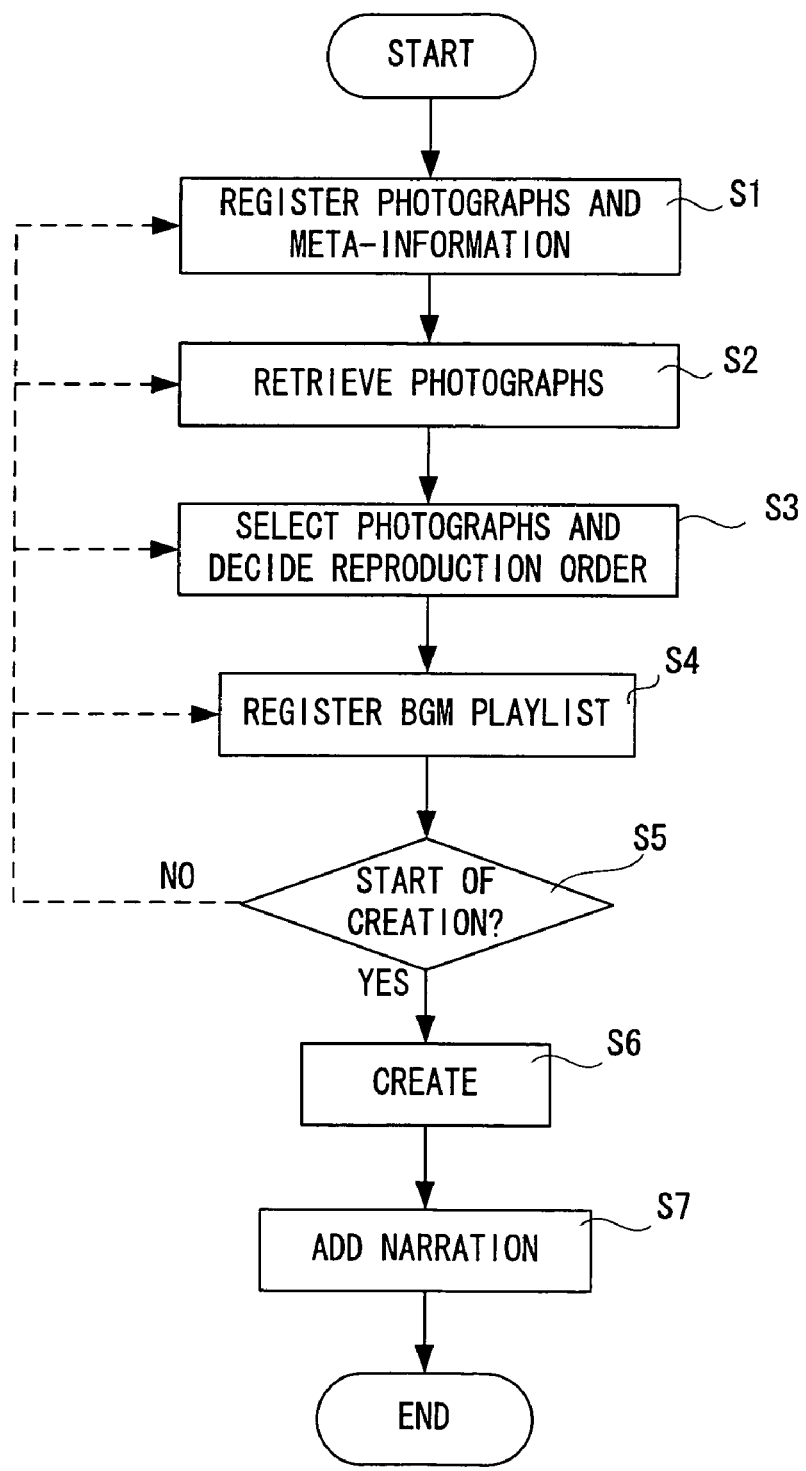
FIG. 21 is a flowchart showing overall operation in further another embodiment of the present invention.

Then, after completion of the step S6 of FIG. 2, the addition of narration is carried out in this embodiment. Although the narration adding step may be carried out during the creating step S6, the step S7 is performed after the step S6 in this embodiment, as shown in FIG. 21.

Figure 20:
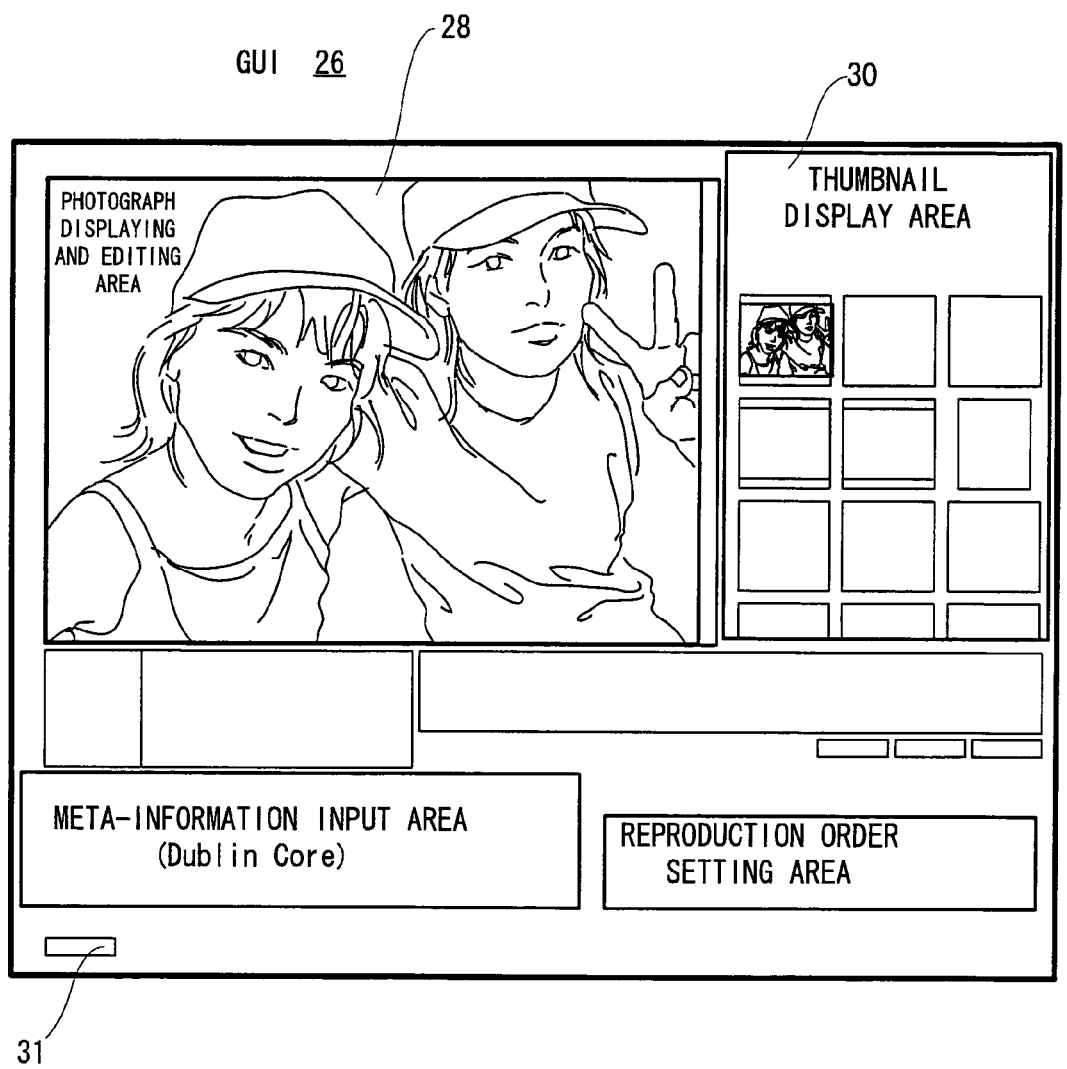
FIG. 20 is an illustrated view showing one example of display of the GUI at the time of photograph input and meta-information registration, which is used in the step S1 of FIG. 21 in still another embodiment of the present invention.
Figure 22:
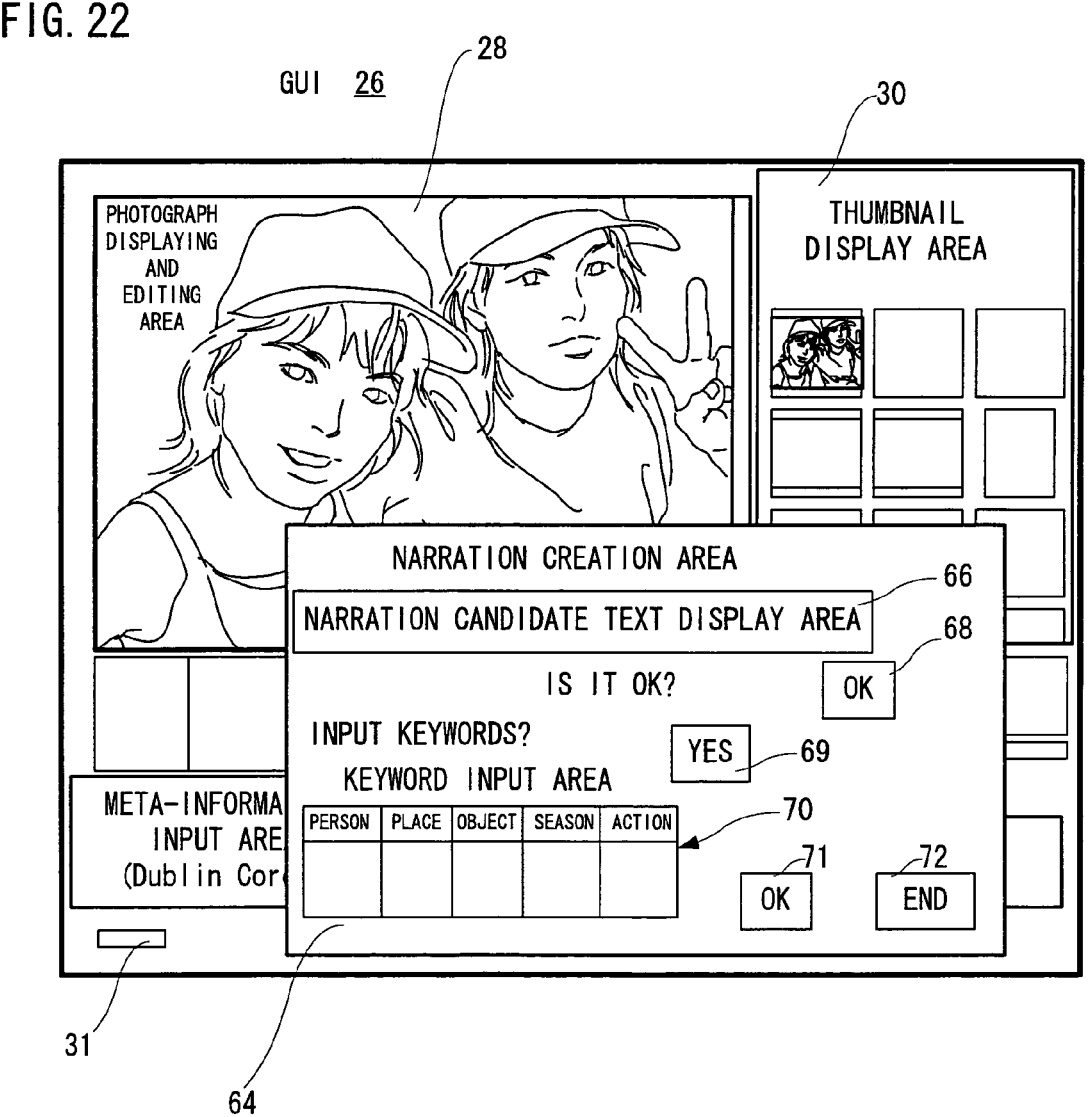
FIG. 22 is an illustrated view showing a narration creating area in the GUI of FIG. 20.

In adding narration, the narration button 31 formed in the GUI 26 shown in FIG. 20 is operated. If narration is required for the created slide show, the user clicks on the narration button 31 with a mouse (not shown). Then, as shown in FIG. 22, a narration creation area 64 is displayed in a pop-up manner in the approximately center of the GUI 26 so as to overlap the photograph displaying and editing area 28 and other areas.

A narration candidate text display area 66 is formed in the narration creation area 64. The narration candidate text display area 66 is an area for, when the computer 12 creates a narration candidate text based on a keyword obtained from the meta-information or a keyword input by the user as described later, displaying a narration candidate text (sentence). An OK button 68 is arranged in relation to the narration candidate text display area 66. The OK button 68 is intended to decide whether or not to select the narration text displayed in the narration candidate text display area 66. This button may be clicked to use the displayed narration candidate.

The narration candidate text display area 66 may display not only one but also a plurality of candidates. In this case, the user may click directly on the area 66 to select the one or the plurality of narration texts.

A designate button 69 is formed under the narration candidate text display area 66. For example, if the computer 12 could not prepare an appropriate narration text, the user can click on the designate button 69 to input an appropriate keyword manually. Then, a keyword input area 70 under the designate button 69 is activated. This allows the user to input a keyword by means of a keyboard not illustrated. Preferably, the keyword input area 70 is divided under a plurality of categories (five in this embodiment) so that keywords by category can be input. The user may see the input area 70 to ascertain whether the intended keywords are input or not. When has ascertained that the intended keywords are input, the user may operate an OK button 71 on the right side of the input area 70. This allows the input of the keywords to be ended.

An end button 72 is arranged on the right of the keyword input OK button 71. The end button 72 is operated to end a narration adding task.

Figure 23:
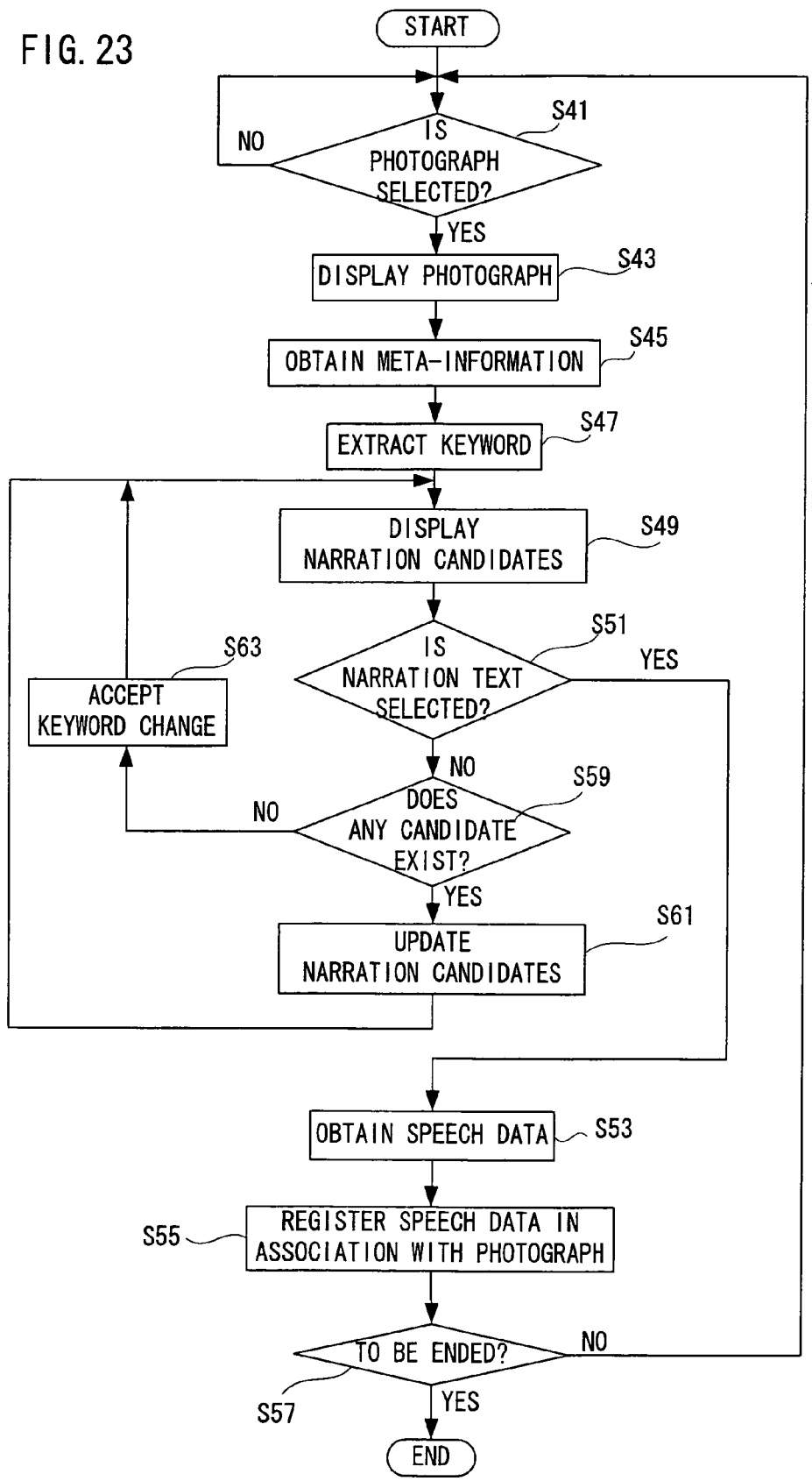
FIG. 23 is a flowchart showing the details of a narration adding operation in a step S7 of FIG. 21.

By operating the narration add button 31 as mentioned above, the GUI 26 is brought into the state as shown in FIG. 22 that makes it possible to perform a narration adding task as shown in FIG. 23.

In a first step S41 of FIG. 23, the computer 12 determines whether the photograph to be provided with narration is selected or not. In order to select the photograph, the user may click on the thumbnail image displayed in the thumbnail display area 30 as described earlier. Then, if determined that the photograph is selected by operating the thumbnail display area 30 in the step S41, the computer 12, in a next step S43, displays the photograph indicated by the selected thumbnail image in the photograph displaying and editing area 28. However, since the GUI 26 is in the "narration addition mode" in which the narration creation area 64 overlaps the photograph displaying and editing area 28, the photograph cannot be edited in this area 28.

In a next step S45, the computer 12 obtains the meta-information registered in the above mentioned way, and extracts keywords from the meta-information in a next step S47. Then, in a step S49, the computer 12 displays a narration candidate text based on these keywords in the narration candidate text display area 66.

Here, the method of creating a narration candidate is described below.

In the system 10 of this embodiment, some typical narration patterns as listed in Table 5 are preset in the internal memory (not shown) or the database 22 (FIG. 1) of the computer 12. In that sense, the internal memory or/and the database 22 function as narration pattern setting means. Then, a narration text is automatically created by applying the words X1 to X5 listed in Table 5, based on the keywords extracted from the meta-information.

TABLE 5

- It is X1. (Is it X1?)
- This is X1. (Is this X1?)
- You did X3 with X2. (Did you do X3 with X2?)
- You did X3 at, in, of, on, etc. X4.
  (Did you do X3 at, in, of, on, etc. X4?)
- You did X3 at, in, of, on, etc. X5.
  (Did you do X3 at, in, of, on, etc. X5?)

The application of the words X1 to X5 complies with Table 6 as an example.

TABLE 6

- X1 <= {[([adverb] + adjective) or (noun 1 + at, in, of, on, etc.)] + noun 2}
    Noun 2 <= person, object, place, season
- X2 <= {[([adverb] + adjective) or (noun 1 + at, in, of, on, etc.)] + noun 2}
    Noun 2 <= person
- X3 <= {[([adverb] + noun 2)]}
    Noun 2 ← action
- X4 <= {[([adverb] + adjective) or (noun 1 + at, in, of, on, etc.)] + noun 2}
    Noun 2 <= place
- X5 <= {[([adverb] + adjective) or (noun 1 + at, in, of, on, etc.)] + noun 2}
    Noun 2 <= place, season For example, in using the first pattern "It is X1. (or is it X1?)" or the second pattern "This is X1. (or is this X1?)" listed in Table 5, the noun 2 of person, object, place or season is applied to the word X1. However, the noun 2 has some variations that are expressed in the form of {[([adverb]+adjective) or (noun 1+at, in, of, on, etc.)]+noun 2}. If this form is resolved, the word applied to the word X1 is "adjective"+noun 2" (e.g. "beautiful"), "adverb+adjective+noun 2" (e.g. "very beautiful flowers"), "adjective+noun 1 at, in, of, on, etc. noun 2" (e.g. "beautiful flowers in the garden"), "adverb+adjective+noun 2 at, in, of, on, etc. noun 1" (e.g. "very beautiful flowers in the garden"), or "noun 2 at, in, of, on, etc. noun 1" (e.g. "flowers in the garden").

In using the third pattern "You did X3 with X2. (or did you do X3 with X2?)" listed in Table 5, the noun 2 of person is applied to the word X2. The noun 2 here is defined in the form of {[([adverb]+adjective) or (noun 1+at, in, of, on, etc.)]+noun 2}, as in the case with the first pattern and the second pattern. In addition, the noun 2 of action is applied to the word X3. The noun 2 here is defined in the form of {[([adverb]+noun 2)]}. That is, the noun 2 (action) may come with or without an adverb (e.g. "(do) traveling enjoyably" or "(do) traveling").

In using the fourth pattern "You did X3 at, in, of, on, etc. X4. (or did you do X3 at, in, of, on, etc. X4?)" listed in Table 5, the noun 2 of place is applied to the word X4. The noun 2 here is defined in the form of {[([adverb]+adjective) or (noun 1+at, in, of, on, etc.)]+noun 2}, as in the above mentioned cases. Also, the same thing as above described applies to the word X3. As examples, the word X3 may be "amusement park" or "department store".

In using the fourth pattern "You did X3 at, in, of, on, etc. X5. (or did you do X3 at, in, of, on, etc. X5?)" listed in Table 5, the noun 2 of season and/or place is applied to the word X5. The noun 2 here is defined in the form of {[([adverb]+adjective) or (noun 1+at, in, of, on, etc.)]+noun 2}, as in the above mentioned cases. The season may be expressed in one of the four seasons of spring, summer, autumn and winter, or in the name of month. In addition, the same thing as described above applies to the word X3.

Moreover, in the above described patterns, the word selected for the noun 2 needs to be appropriate in fineness or roughness in terms of a conceptual structure of general noun. Also, the assigned adverb, adjective and noun 1 must match with the noun 2. For the "matching", a matching table not illustrated is prepared, the word for the noun 2 is decided, and then the adverb, adjective and noun 1 are employed by referring to the matching table.

In this manner, the words as defined in Table 6 are assigned to the narration patterns X-1 to X-5 of Table 5. In this embodiment, these "words" are obtained from the meta-information added to the photographs.

Figure 24:
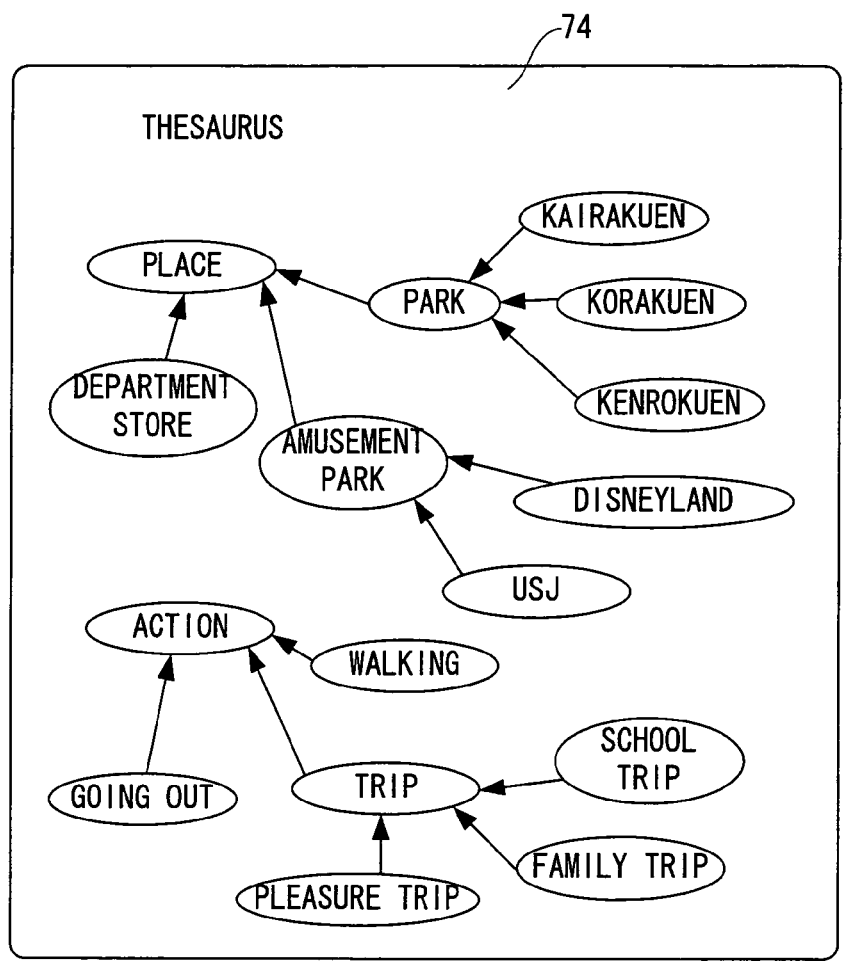
FIG. 24 is an illustrated view showing a thesaurus used for addition of narration.
Figure 25:
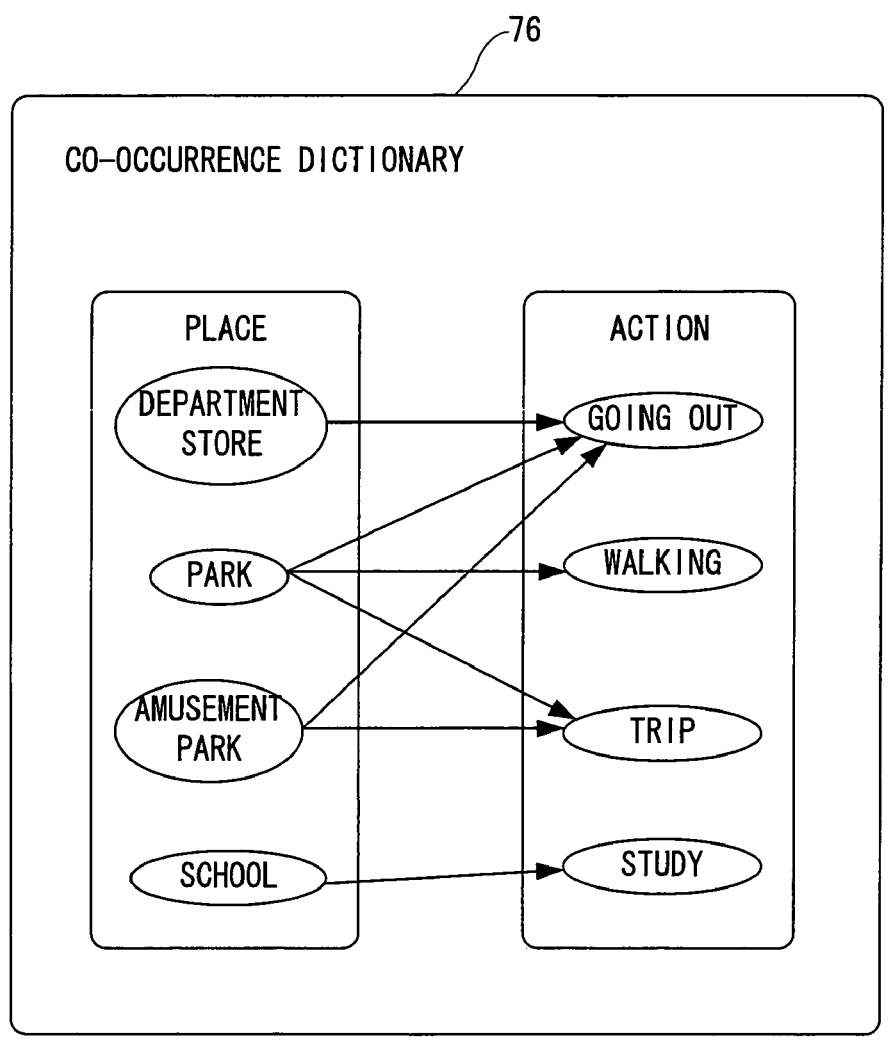
FIG. 25 is an illustrated view showing a co-occurrence dictionary used for addition of narration.

FIG. 24 and FIG. 25 illustrate a thesaurus 74 and a co-occurrence dictionary 76 that function as word deciding means. Both the thesaurus 74 and the co-occurrence dictionary 76 are data dictionaries. In this embodiment, they are preset in the database 22 or the internal memory in the computer 12 shown in FIG. 1.

The thesaurus 74 presents notational fluctuations, related terms, synonyms, similar words, etc. by category under a layered system of tree structures or networks of conceptually similar keywords, as shown in FIG. 24. In the example of FIG. 24, "place" and "action" are shown as categories. For instance, the unique nouns "Kairakuen", "Korakuen" and "Kenrokuen" (all of them are famous parks in Japan) are grouped under the concept of "park", and the unique nouns "Disney Land" and "USJ" are under the concept of "amusement park". These "park" and "amusement park" fall under the category of "place", together with other concepts including "department store", for example. The same thing applies to the category of "action". The items related to "XX trip" are collectively expressed under the concept of "trip". The "trip" is classified under the category of "action", together with other concepts such as "walking", "going out", etc. Likewise, some keywords are also built up for the other categories "person", "season", etc. that are appropriate to the noun 2 in the above mentioned narration patterns.

Relationship or connection between specific words is called co-occurrence relation. The co-occurrence dictionary 76 shows co-occurrence relations between the keywords fallen under the categories, "place" and "action", for instance, as shown in FIG. 25. As an example, according to the co-occurrence dictionary 76, it is found out that the keyword "department store" under the category "place" connects only with the keyword "going out" under the category "action", but the keyword "park" has a strong link with a plurality of keywords "going out", "walking" and "trip".

Narration candidate text is prepared in the step S49 by using these tools to apply words, the nouns 2 in particular, to the narration patterns listed in Table 5.

Specific examples of narration candidates are described below. The meta-information shown in FIG. 17 contains "2004.07.16" as a date (dc:date), "Disney Animal Kingdom" as a title (dc:title), "rel:grandchild0f" as a person (faof:person), and "Haruka" as a name (foaf:name).

Firstly, from the date "Jul. 16, 2004", it is understood that the appropriate word under the category "season" is "summer" by reference to the thesaurus 74, although it is not shown in FIG. 24. Searching the thesaurus 74 shown in FIG. 24 for the word "Disney" contained in the title "at Disney Animal Kingdom" reveals that the word is subsumed under "amusement park", and that the keyword "amusement park" falls under the category "place". Moreover, referring to the co-occurrence dictionary 76 shown in FIG. 25 makes it clear that the keyword "amusement park" has co-occurrence relations with the three actions "going out", "walking" and "trip". Furthermore, it is apparent that the item "grandchild" exists under the keyword "person" and its name is "Haruka". In this manner, by extracting the keywords from the meta-information and retrieving the "words" applicable to the narration pattern by use of the keywords, it is clear that the season is "summer", the place is "amusement park", the action is "going out", "walking" or "trip", and the person is "grandchild Haruka".

Accordingly, the computer 12 generates three narration texts as shown in Table 7 in the step S49, for example.

TABLE 7

| Person | Place | Object | Season | Action | Narration text |
|---|---|---|---|---|---|
| — | Amusement park | — | Summer | — | It is an amusement park in summer. |
| Haruka | Amusement park | — | Summer | Trip | You made a trip to the amusement park with your grandchild Haruka. |
| | Amusement park | | Summer | Trip | You made a trip to the amusement park in summer. |

The first candidate listed in Table 7 is prepared by applying the words to the first narration pattern, the second candidate by applying the words to the third narration pattern, and the third candidate by applying the words to the fifth narration pattern.

Then, in the step S49, these narration texts are displayed as narration candidates at a time or by turns in the narration candidate text display area 66.

Then, the computer 12 determines in a step S51 whether any of these narration candidate texts is selected or not. If any of the narration candidate texts is selected, the computer 12 obtains speech data for the narration text in a next step S53.

In this embodiment, voice models are registered in the database 22 or the internal memory in the computer 12 shown in FIG. 1. When a narration text is decided, a narration speech is prepared by voice synthesis using the voice models. Alternatively, it is possible to record data under voice uttered by a professional narrator, for example, in the internal memory or the database 22, and prepare a narration speech by editing the speech data.

Then, in a step S55, the computer 12 associates the narration speech data obtained or produced in the step S53 with the photograph selected in the step S41, and registered it in the database 22.

In this manner, the narration speech data for the one photograph is added to the photograph. In a next step S57, the computer 12 determines whether or not there remains any photograph yet to be provided with narration. If the addition of narration is to be still continued, the end button 72 (FIG. 22) is not pressed and the process is returned to the previous step S41. If the end button 72 is pressed, the determination is recognized as "YES" in the step S57, and the narration adding step S7 of FIG. 21 is terminated.

However, if none of the narration candidates displayed in the previous step S49 is selected in the step S51, the computer 12 determines in a next step S59 whether or not any narration candidate still remains. If there remains any candidate, the computer 12 updates the narration candidates in a next step S61, and displays them again in the narration candidate text display area 66 (the step S49), and waits for the user to make a selection.

Besides, if determined in the step S59 that there is no appropriate candidate, the computer 12 accepts the user's keyword change (the step S63). For keyword input, the user operates the designation button 69 (FIG. 22) and enters the keyword into the keyword input area 70. At that time, the user inputs {person, object, place, season, action} corresponding to the noun 1 and the noun 2 for the narration pattern (Table 5), and {how and what} corresponding to the adverb and the adjective. However, it is not necessary to designate all the categories or all the items.

After the user input the keywords in this manner, the computer 12, in the step S49 as described below, decides the "words" from the user-input keywords by using the thesaurus 74 or the co-occurrence dictionary 76, and applies these words to the narration patterns listed in Table 5 to create and display the narration texts. After that, as explained earlier, the user selects and decides one of the displayed narration candidate texts.

By performing the steps shown in FIG. 23 in this manner, it is possible to create a video content such as reminiscence video with narration. Some video effects are added in the above described embodiments, but they may be not necessarily used.

Additionally, according to the above description, the narration adding step S7 needs to be performed after the creating step S6. As a matter of course, the addition of narration may be also performed in parallel with the addition of video effects, for example, during the creating step of S6.

Moreover, in the above mentioned embodiments, no change is made to the narration texts prepared by the narration creating means. However, the narration texts may be changed as necessary by the user's input operation.

Furthermore, using the voice synthesis technique of the embodiment makes it easy to produce a call to the dementia patient as a viewer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video content creating apparatus, having a storage for storing a plurality of photographic image data and meta-information including region information including coordinate data and size data of one or more regions individually set to each photographic image data, which creates a video content by use of said photographic image data and the meta-information associated therewith, comprising:

a retriever for retrieving photographic image data from said storage by use of said meta-information; and a GUI displayer for displaying a GUI screen including a photograph displaying area for displaying a photograph according to the photographic image data retrieved by said retriever, a thumbnail image display area to display a thumbnail image according to said photographic image data, and a reproduction order setting area including a photograph list section, wherein by dragging and dropping a thumbnail image displayed in said thumbnail image display area toward said photograph list section, a plurality of photographs to be actually used are selected out of said retrieved photographic image data, by changing the list registration order in said photograph list section, a reproduction order of said plurality of photographs is changed, further comprising:

a photograph displayer for reading the photographic image data of said photograph listed in the list section and the meta-information associated therewith from said storage and displaying the photograph in said photograph displaying area; and a creator for creating a series of video content by editing according to the meta-information the photographic image data read by said photograph displaying means, wherein said creator includes a determiner for determining whether or not region information is included in the meta-information associated with the photographic image data read by said photograph displayer, and an aligner for aligning an image of a region indicated by said region information according to said coordinate data and said size data included in the region information within said photograph displaying area when said determiner determines that said region information is included in said meta-information, further comprising a saver for saving the generated video content into a recording medium.

2. A video content creating apparatus according to claim 1, wherein said photograph displayer further includes a fade-inner for displaying, in a fade-in manner, the photograph read from said storage in said photograph displaying area, further comprising:

a fade-outer for fading out the photograph from said photograph displaying area when there is no region set to the photographic image data read by said photograph displayer.

3. A video content creating apparatus according to claim 2, further comprising a playlist registerer for registering a playlist containing music numbers, wherein a music number reproducer for reproducing a music number registered in said playlist is included when the photograph according to said photographic image data is displayed in a fade-in manner in said photograph displaying area by said fade-inner, and said video content includes the music numbers to be reproduced as music background.

4. A video content creating apparatus according to claim 1, wherein said creators includes a video effect applyer for applying a video effect based on said meta-information, said meta-information includes between-regions space information of the regions set in one photographic image data, and said video effect applyer applies video effects varied according to said between-regions space information.

5. A video content creating apparatus according to claim 1, wherein said creator includes a narration candidate text creator for creating a narration candidate text based on said meta-information, and a speech data registerer for registering, when a narration candidate text is selected, in said storage speech data according to said narration candidate text in relation to said photographic images.

6. A video content creating method, having a storage for storing a plurality of photographic image data and meta-information including region information including coordinate data and size data of one or more regions individually set to each photographic image data, and creating a video content by using said photographic image data and the meta-information associated therewith, including steps of:

a retrieving step for retrieving photographic image data from said storing means by use of said meta-information; and a GUI displaying step for displaying a GUI screen including a photograph displaying area for displaying a photograph according to the photographic image data retrieved by said retrieving step, a thumbnail image display area to display a thumbnail image according to said photographic image data, and a reproduction order setting area including a photograph list section, wherein by dragging and dropping a thumbnail image displayed in said thumbnail image display area toward said photograph list section, a plurality of photographs to be actually used are selected out of said retrieved photographic image data, by changing the list registration order in said photograph list section, a reproduction order of said plurality of photographs is changed, further comprising:

a photograph displaying step for reading photographic the image data of said photograph listed in the list section and the meta-information associated therewith from said storing means and displaying the photograph in said photograph displaying area; and a creating step for creating a series of video content by editing according to the meta-information the photographic image data read by said photograph displaying step, wherein said creating step includes a determining step for determining whether or not region information is included in the meta-information associated with the photographic image data read by said photograph displaying step, and an aligning step for aligning an image of a region indicated by said region information according to said coordinate data and said size data included in the region information within said photograph displaying area when it is determined in said determining step that said region information is included in said meta-information, further including a step for storing the generated video content into a recording medium.

7. A video content creating apparatus, comprising:

a storage for storing photographic image data together with related meta-information;

a retriever for retrieving the photographic image data from said storage by use of said meta-information; and a displayer for displaying a GUI screen including a thumbnail image display area to display a thumbnail image according to the photographic image data retrieved by said retriever and a reproduction order setting area including a photograph list section, wherein by dragging and dropping a thumbnail image displayed in said thumbnail image display area toward said photograph list section, a plurality of photographs to be actually used are selected out of said retrieved photographic image data, and by changing the list registration order in said photograph list section, a reproduction order of said plurality of photographs is changed, further comprising a reader for reading the photographic image data of said photograph listed in the list section and the meta-information associated therewith from said storage, and a creator for creating a series of video content by editing according to the meta-information the photographic image data read by said reader, wherein a narration creating area having a narration candidate text displaying area to display narration candidate text and an instruction input portion to instruct whether or not said narration candidate text is to be selected are formed on said GUI screen, and said creator including:

a narration candidate text displayer for creating a narration candidate text on the basis of said meta-information read by said reader and displaying the same in said narration candidate text displaying area, a narration speech data creator for creating narration speech data according to the narration candidate text when said narration candidate text displayed in said narration candidate text displaying area is selected with said instruction input portion, and a registerer for registering said narration speech data by bringing it into associated with the photographic image data read by said reader.

8. A video content creating apparatus according to claim 7, wherein said narration candidate text displayer includes a narration pattern presetter for presetting a narration pattern containing at least one word and a word decider for deciding said word based on said meta-information, and creates said narration candidate text by applying the word decided by said word decider to said word in said narration pattern.

* * * * *